(12) United States Patent
Sandhu et al.

(10) Patent No.: US 10,117,144 B2
(45) Date of Patent: Oct. 30, 2018

(54) TECHNIQUES FOR MANAGING INTER-RADIO ACCESS TECHNOLOGY HANDOVERS FOR HIGH GAIN USER EQUIPMENT

(71) Applicant: QUALCOMM Incorporated, San Diego, CA (US)

(72) Inventors: Manjinder Singh Sandhu, Poway, CA (US); Madhusudan Kinthada Venkata, San Diego, CA (US); Raj Surya Pratha, San Diego, CA (US); Siva Kumar Jujaray, San Diego, CA (US); Srinivasan Balasubramanian, San Diego, CA (US); Patrick James Kusbel, Longmont, CO (US); Joshua Tennyson MacDonald, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 14/949,319

(22) Filed: Nov. 23, 2015

(65) Prior Publication Data
US 2016/0150445 A1 May 26, 2016

Related U.S. Application Data

(60) Provisional application No. 62/085,167, filed on Nov. 26, 2014.

(51) Int. Cl.
*H04W 36/00* (2009.01)
*H04W 24/10* (2009.01)
*H04W 36/14* (2009.01)

(52) U.S. Cl.
CPC ........ *H04W 36/0094* (2013.01); *H04W 24/10* (2013.01); *H04W 36/14* (2013.01)

(58) Field of Classification Search
CPC ................................................. H04W 36/0094
See application file for complete search history.

(56) References Cited

U.S. PATENT DOCUMENTS 7,171,179 B2 * 1/2007 Zhou .................... H04B 17/318
455/115.3
7,171,229 B2 * 1/2007 Moulsley .............. H04L 1/0026
455/226.3

(Continued)

FOREIGN PATENT DOCUMENTS

WO 0051389 A1 8/2000

OTHER PUBLICATIONS

International Search Report and Written Opinion—PCT/US2015/062546—ISA/EPO—dated Feb. 17, 2016.

*Primary Examiner* — Anh Vu H Ly
(74) *Attorney, Agent, or Firm* — Dalei Dong; Arent Fox

(57) ABSTRACT

A method, an apparatus, and a computer-readable medium for wireless communication are provided. The apparatus may include memory and at least one processor, coupled to the memory, configured to determine a power parameter associated with communication using a first radio access technology (RAT). The at least one processor may be further configured to determine a quality parameter associated with the communication using the first RAT. The at least one processor may be further configured to apply, based on the quality parameter, an offset to the power parameter to form a modified power parameter. The at least one processor may be further configured to transmit a measurement report including the modified power parameter. The apparatus may be a wireless device, such as a user equipment (UE) and, more specifically, a high gain UE.

27 Claims, 9 Drawing Sheets

(56) References Cited

U.S. PATENT DOCUMENTS

| | | | | |
|---|---|---|---|---|
| 2002/0115443 | A1* | 8/2002 | Freiberg | H04L 1/0002 |
| | | | | 455/450 |
| 2010/0124931 | A1* | 5/2010 | Eskicioglu | H04W 36/32 |
| | | | | 455/440 |
| 2011/0116395 | A1 | 5/2011 | Tsuda | |
| 2011/0195708 | A1* | 8/2011 | Moberg | H04W 36/0094 |
| | | | | 455/424 |
| 2012/0295606 | A1* | 11/2012 | Sebire | H04W 36/0094 |
| | | | | 455/422.1 |
| 2014/0098693 | A1 | 4/2014 | Tabet et al. | |
| 2014/0200003 | A1* | 7/2014 | Kodali | H04W 36/30 |
| | | | | 455/436 |
| 2015/0312817 | A1* | 10/2015 | Huang | H04W 36/0094 |
| | | | | 370/332 |
| 2016/0050608 | A1* | 2/2016 | Fan | H04W 36/0083 |
| | | | | 370/280 |

* cited by examiner

TECHNIQUES FOR MANAGING INTER-RADIO ACCESS TECHNOLOGY HANDOVERS FOR HIGH GAIN USER EQUIPMENT

CROSS-REFERENCE TO RELATED APPLICATION(S)

This application claims the benefit of U.S. Provisional Application Ser. No. 62/085,167, entitled "Techniques for Managing Inter-Radio Access Technology Handovers for High Gain User Equipment" and filed on Nov. 26, 2014, which is expressly incorporated by reference herein in its entirety.

BACKGROUND

Field of the Disclosure

The present disclosure relates generally to communication systems, and more particularly, to techniques for managing inter-radio access technology handovers for high gain user equipment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The present disclosure, for example, relates to techniques for managing inter-radio access technology handovers for high gain user equipment. In an example, the techniques described an apparatus that may include memory and at least one processor, coupled to the memory, configured to determine a power parameter associated with communication using a first radio access technology (RAT). The at least one processor may be further configured to determine a quality parameter associated with the communication using the first RAT. The at least one processor may be further configured to apply, based on the quality parameter, an offset to the power parameter to form a modified power parameter. The at least one processor may be further configured to transmit a measurement report including the modified power parameter.

In an aspect, the power parameter includes a reference signal received power. In an aspect, the quality parameter includes a reference signal received quality or a block error rate. In an aspect, the at least one processor is further configured to determine the offset based on the quality parameter. In an aspect, the at least one processor is configured to apply the offset further based on determination that a power gain satisfies a power gain threshold, and the at least one processor is further configured to determine the power gain and determine that the power gain satisfies the power gain threshold. In an aspect, the at least one processor is configured to apply, based on the quality parameter, the offset to the power parameter to form a modified power parameter by determining that the quality parameter satisfies a quality threshold and applying the offset to the power parameter when the quality parameter satisfies the quality threshold. In an aspect, the at least one processor is configured to apply the offset to the power parameter further based on determination that a second quality parameter satisfies a second quality threshold, the at least one processor further configured to determine that the second quality parameter satisfies the second quality threshold. In an aspect, the at least one processor is configured to transmit the measurement report based on determination that the modified power parameter satisfies a reporting threshold, the at least one processor further configured to determine that the modified power parameter satisfies the reporting threshold. In an aspect, the measurement report is transmitted to a serving base station in association with handover to a neighbor base station, the at least one processor further configured to receive the communication from the serving base station, wherein the serving base station associated with a first RAT and the neighbor base station associated with a second RAT.

In one example, the method may include an operation for determining a power parameter associated with communication using a first RAT. The method may further include an operation for determining a quality parameter associated with the communication using the first RAT. The method may further include an operation for applying, based on the quality parameter, an offset to the power parameter to form a modified power parameter. The method may further include an operation for transmitting a measurement report including the modified power parameter. The method may be performed by a user equipment (UE).

In an aspect, the power parameter may include a reference signal received power. In an aspect, the quality parameter includes a reference signal received quality or a block error rate. In an aspect, the method further includes an operation for determining the offset based on the quality parameter. In an aspect, the applying of the offset is further based on determining that a power gain satisfies a power gain threshold, and the method further includes operations for determining, by the UE, the power gain and determining, by the UE, that the power gain satisfies the power gain threshold. In an aspect, the applying, based on the quality parameter, the offset to the power parameter to form a modified power parameter includes determining that the quality parameter satisfies a quality threshold and applying the offset to the power parameter when the quality parameter satisfies the quality threshold. In an aspect, the applying the offset to the power parameter is further based on determining that a second quality parameter satisfies a second quality threshold, the method further includes an operation for determining that the second quality parameter satisfies the second quality threshold. In an aspect, the transmitting the measurement report is based on determining that the modified power parameter satisfies a reporting threshold, the method further includes an operation for determining that the modified power parameter satisfies the reporting threshold. In an aspect, the measurement report is transmitted to a serving base station in association with handover to a neighbor base station, the method further includes an operation for receiving the communication from the serving base station, the serving base station associated with a first RAT and the neighbor base station associated with a second RAT. In an aspect, the first RAT is different from the second RAT.

In an example, the computer-readable medium may store computer executable code for wireless communication, including code for determining a power parameter associated with communication using a first RAT. The computer-readable medium may further include code for determining a quality parameter associated with the communication using the first RAT. The computer-readable medium may further include code for applying, based on the quality parameter, an offset to the power parameter to form a modified power parameter. The computer-readable medium may further include code for transmitting a measurement report including the modified power parameter. Other aspects may be described herein.

In an aspect, the power parameter includes a reference signal received power. In an aspect, the quality parameter includes a reference signal received quality or a block error rate. In an aspect, the code further includes code for determining the offset based on the quality parameter. In an aspect, the applying of the offset is further based on determining that a power gain satisfies a power gain threshold, and the code further includes code for determining, by the UE, the power gain and determining, by the UE, that the power gain satisfies the power gain threshold. In an aspect, the applying, based on the quality parameter, the offset to the power parameter to form a modified power parameter includes determining that the quality parameter satisfies a quality threshold and applying the offset to the power parameter when the quality parameter satisfies the quality threshold. In an aspect, the applying the offset to the power parameter is further based on determining that a second quality parameter satisfies a second quality threshold, the code further includes code for determining that the second quality parameter satisfies the second quality threshold. In an aspect, the transmitting the measurement report is based on determining that the modified power parameter satisfies a reporting threshold, the code further includes code for determining that the modified power parameter satisfies the reporting threshold. In an aspect, the measurement report is transmitted to a serving base station in association with handover to a neighbor base station, the code further includes code for receiving the communication from the serving base station, the serving base station associated with a first RAT and the neighbor base station associated with a second RAT. In an aspect, the first RAT is different from the second RAT.

According to an aspect, the present disclosure describes a method for wireless communication, including determining, by a UE, a power parameter associated with a communication using a first RAT. The method may further include determining, by the UE, a quality parameter associated with the communication using the first RAT. The method may further include applying, by the UE, an offset to the power parameter, to form a modified power parameter, based on the quality parameter and based on a determination that a power gain of the UE satisfies a power gain threshold. The method may further include providing, by the UE, a measurement report, that includes the modified power parameter, for a handover from the first RAT to a second RAT. In an aspect, the power parameter represents a reference signal received power (RSRP). In an aspect, the quality parameter represents at least one of a reference signal received quality (RSRQ) or a block error rate (BLER). In an aspect, the first RAT is a fourth generation (4G) RAT. In an aspect, the second RAT is a third generation (3G) RAT. In an aspect, the method may further include calculating the offset, using the quality parameter, to form a calculated offset. In an aspect, applying the offset to the power parameter includes applying the calculated offset to the power parameter. In an aspect, the offset is inversely proportional to the quality parameter. In an aspect, applying the offset to the power parameter includes subtracting the offset from the power parameter. In an aspect, the method further includes determining the power gain. In an aspect, the method further includes determining that the power gain satisfies the power gain threshold. In an aspect, applying the offset to the power parameter includes applying the offset to the power parameter based on determining that the power gain satisfies the power gain threshold. In an aspect, the method further includes calculating the offset based on the power gain. In an aspect, applying the offset to the power parameter includes applying the offset to the power parameter based on calculating the offset. In an aspect, the offset is proportional to the power gain. In an aspect, the method further includes determining that the quality parameter satisfies a quality threshold. In an aspect, applying the offset to the power parameter includes applying the offset to the power parameter based on determining that the quality parameter satisfies the quality threshold. In an aspect, the method further includes determining that a first quality parameter satisfies a first quality threshold. In an aspect, the method further includes determining that a second quality parameter satisfies a second quality threshold. In an aspect, applying the offset to the power parameter includes applying the offset to the power parameter based on determining that the first quality parameter satisfies the first quality threshold and determining that the second quality parameter satisfies the second quality threshold. In an aspect, the first quality parameter is different from the second quality parameter. In an aspect, the first quality threshold is different from the second quality threshold. In an aspect, the first quality parameter represents a RSRQ. In an aspect, the second quality parameter represents a BLER. In an aspect, the power parameter represents at least one of a RSRP, a received signal code power (RSCP), a ratio of a received energy per chip to an interference level (Ec/Io), or a received signal strength indicator (RSSI). In an aspect, the quality parameter represents at least one of a RSRQ, a BLER, or a signal to noise ratio (SINR). In an aspect, the first RAT includes one of a 4G RAT, a 3G RAT, a second generation (2G) RAT, or a Wi-Fi RAT and the second RAT includes a different one of the 4G RAT, the 3G RAT, the 2G RAT, or the Wi-Fi RAT. In an aspect, the method further includes determining that the modified power parameter satisfies a reporting threshold. In an aspect, providing the measurement report includes providing the measurement report based on determining that the modified power parameter satisfies the reporting threshold. In an aspect, the first RAT is different from the second RAT. In an aspect, the communication is received from a serving base station associated with the first RAT and the second RAT is associated with a neighbor base station. In an aspect, providing the measurement report includes providing the measurement report to the serving base station for the handover to the neighbor base station.

According to an aspect of the present disclosure, a UE is described that includes one or more processors to determine a power parameter associated with a communication using a first RAT. The one or more processors may determine a quality parameter associated with the communication using the first RAT. The one or more processors may apply an offset to the power parameter, to form a modified power parameter, based on the quality parameter and based on a determination that a power gain of the UE satisfies a power gain threshold. The one or more processors may provide a measurement report, that includes the modified power parameter, for a handover from the first RAT to a second RAT. In an aspect, the power parameter represents a RSRP. In an aspect, the quality parameter represents at least one of a RSRQ or a BLER. In an aspect, the first RAT is a 4G RAT and the second RAT is a 3G RAT. In an aspect, the one or more processors are further to calculate the offset, using the quality parameter, to form a calculated offset. In an aspect, the one or more processors, when applying the offset to the power parameter, are further to apply the calculated offset to the power parameter. In an aspect, the offset is inversely proportional to the quality parameter. In an aspect, the one or more processors, when applying the offset to the power parameter, are further to subtract the offset from the power parameter. In an aspect, the one or more processors are further to determine the power gain and determine that the power gain satisfies the power gain threshold. In an aspect, the one or more processors, when applying the offset to the power parameter, are further to apply the offset to the power parameter based on determining that the power gain satisfies the power gain threshold. In an aspect, the one or more processors are further to calculate the offset based on the power gain. In an aspect, the one or more processors, when applying the offset to the power parameter, are further to apply the offset to the power parameter based on calculating the offset. In an aspect, the offset is proportional to the power gain. In an aspect, the one or more processors are further to determine that the quality parameter satisfies a quality threshold. In an aspect, the one or more processors, when applying the offset to the power parameter, are further to apply the offset to the power parameter based on determining that the quality parameter satisfies the quality threshold. In an aspect, the one or more processors are further to determine that a first quality parameter satisfies a first quality threshold and determine that a second quality parameter satisfies a second quality threshold. In an aspect, the one or more processors, when applying the offset to the power parameter, are further to apply the offset to the power parameter based on determining that the first quality parameter satisfies the first quality threshold and determining that the second quality parameter satisfies the second quality threshold. In an aspect, the first quality parameter is different from the second quality parameter and the first quality threshold is different from the second quality threshold. In an aspect, the first quality parameter represents a RSRQ and the second quality parameter represents a BLER. In an aspect, the power parameter represents at least one of a RSRP, a RSCP, a Ec/Io, or a RSSI. In an aspect, the quality parameter represents at least one of a RSRQ, a BLER, or a SINR. In an aspect, the first RAT includes one of a 4G RAT, a 3G RAT, a 2G RAT, or a Wi-Fi RAT and the second RAT includes a different one of the 4G RAT, the 3G RAT, the 2G RAT, or the Wi-Fi RAT. In an aspect, the one or more processors are further to determine that the modified power parameter satisfies a reporting threshold and, when providing the measurement report, are further to provide the measurement report based on determining that the modified power parameter satisfies the reporting threshold. In an aspect, the first RAT is different from the second RAT. In an aspect, the communication is received from a serving base station associated with the first RAT and the second RAT is associated with a neighbor base station, and the one or more processors, when providing the measurement report, are further to provide the measurement report to the serving base station for the handover to the neighbor base station.

According to aspects of the present disclosure, a non-transitory computer-readable medium storing instructions for wireless communication is described. The instructions include, one or more instructions that, when executed by one or more processors of a UE, cause the one or more processors to determine a power parameter associated with a communication using a first radio access technology RAT; determine a quality parameter associated with the communication using the first RAT; apply an offset to the power parameter, to form a modified power parameter, based on the quality parameter and based on a determination that a power gain of the UE satisfies a power gain threshold; and provide a measurement report, that includes the modified power parameter, for a handover from the first RAT to a second RAT. In an aspect, the power parameter represents a RSRP. In an aspect, the quality parameter represents at least one of a RSRQ or a BLER. In an aspect, the first RAT is a 4G RAT and the second RAT is a 3G RAT. In an aspect, the one or more instructions, when executed by the one or more processors, further cause the one or more processors to calculate the offset, using the quality parameter, to form a calculated offset; and the one or more instructions, that cause the one or more processors to apply the offset to the power parameter, further cause the one or more processors to apply the calculated offset to the power parameter. In an aspect, the offset is inversely proportional to the quality parameter. In an aspect, the one or more instructions, that cause the one or more processors to apply the offset to the power parameter, further cause the one or more processors to subtract the offset from the power parameter. In an aspect, the one or more instructions, when executed by the one or more processors, further cause the one or more processors to: determine the power gain; determine that the power gain satisfies the power gain threshold; and the one or more instructions, that cause the one or more processors to apply the offset to the power parameter, further cause the one or more processors to apply the offset to the power parameter based on determining that the power gain satisfies the power gain threshold. In an aspect, the one or more instructions, when executed by the one or more processors, further cause the one or more processors to calculate the offset based on the power gain; and the one or more instructions, that cause the one or more processors to apply the offset to the power parameter, further cause the one or more processors to apply the offset to the power parameter based on calculating the offset. In an aspect, the offset is proportional to the power gain. In an aspect, the one or more instructions, when executed by the one or more processors, further cause the one or more processors to determine that the quality parameter satisfies a quality threshold; and the one or more instructions, that cause the one or more processors to apply the offset to the power parameter, further cause the one or more processors to apply the offset to the power parameter based on determining that the quality parameter satisfies the quality threshold. In an aspect, the one or more instructions, when executed by the one or more processors, further cause the one or more processors to determine that a first quality parameter satisfies a first quality threshold; determine that a second quality parameter satisfies a second quality threshold; and the one or more instructions, that cause the one or more processors to apply the offset to the power parameter, further cause the one or more processors to apply the offset to the power parameter based on determining that the first quality parameter satisfies the first quality threshold and determining that the second quality parameter satisfies the second quality threshold. In an aspect, the first quality parameter is different from the second quality parameter and the first quality threshold is different from the second quality threshold. In an aspect, the first quality parameter represents a RSRQ and the second quality parameter represents a BLER. In an aspect, the power parameter represents at least one of a RSRP, a RSCP, a Ec/Io, or a RSSI. In an aspect, the quality parameter represents at least one of a RSRQ, a BLER, or a SINR. In an aspect, the first RAT includes one of a 4G RAT, a 3G RAT, a 2G RAT, or a Wi-Fi RAT; and the second RAT includes a different one of the 4G RAT, the 3G RAT, the 2G RAT, or the Wi-Fi RAT. In an aspect, the one or more instructions, when executed by the one or more processors, further cause the one or more processors to determine that the modified power parameter satisfies a reporting threshold; and the one or more instructions, that cause the one or more processors to provide the measurement report, further cause the one or more processors to provide the measurement report based on determining that the modified power parameter satisfies the reporting threshold. In an aspect, the first RAT is different from the second RAT. In an aspect, the communication is received from a serving base station associated with the first RAT and the second RAT is associated with a neighbor base station, and the one or more instructions, that cause the one or more processors to provide the measurement report, further cause the one or more processors to provide the measurement report to the serving base station for the handover to the neighbor base station.

According to aspects of the present disclosure, an apparatus for wireless communication is described. The apparatus includes means for determining a power parameter associated with a communication using a first radio access technology (RAT); means for determining a quality parameter associated with the communication using the first RAT; means for applying an offset to the power parameter, to form a modified power parameter, based on the quality parameter and based on a determination that a power gain of a user equipment (UE) satisfies a power gain threshold; and means for providing a measurement report, that includes the modified power parameter, for a handover from the first RAT to a second RAT. In an aspect, the power parameter represents a RSRP. In an aspect, the quality parameter represents at least one of a RSRQ or a BLER. In an aspect, the first RAT is a 4G RAT; and the second RAT is a 3G RAT. In an aspect, the apparatus further includes means for calculating the offset, using the quality parameter, to form a calculated offset, and the means for applying the offset to the power parameter includes means for applying the calculated offset to the power parameter. In an aspect, the offset is inversely proportional to the quality parameter. In an aspect, the means for applying the offset to the power parameter includes means for subtracting the offset from the power parameter. In an aspect, the apparatus further includes means for determining the power gain and means for determining that the power gain satisfies the power gain threshold, and the means for applying the offset to the power parameter includes means for applying the offset to the power parameter based on determining that the power gain satisfies the power gain threshold. In an aspect, the means for calculating the offset based on the power gain; and the means for applying the offset to the power parameter includes means for applying the offset to the power parameter based on calculating the offset. In an aspect, the offset is proportional to the power gain. In an aspect, the apparatus further includes means for determining that the quality parameter satisfies a quality threshold; and the means for applying the offset to the power parameter includes means for applying the offset to the power parameter based on determining that the quality parameter satisfies the quality threshold. In an aspect, the apparatus further includes means for determining that a first quality parameter satisfies a first quality threshold and means for determining that a second quality parameter satisfies a second quality threshold, and the means for applying the offset to the power parameter includes means for applying the offset to the power parameter based on determining that the first quality parameter satisfies the first quality threshold and determining that the second quality parameter satisfies the second quality threshold. In an aspect, the first quality parameter is different from the second quality parameter and the first quality threshold is different from the second quality threshold. In an aspect, the first quality parameter represents a RSRQ and the second quality parameter represents a BLER. In an aspect, the power parameter represents at least one of a RSRP, a RSCP, a Ec/Io, or a RSSI. In an aspect, the quality parameter represents at least one of a RSRQ, a BLER, or a SINR. In an aspect, the first RAT includes a 4G RAT, a 3G RAT, a 2G RAT, or a Wi-Fi RAT, and an the second RAT includes a different one of the 4G RAT, the 3G RAT, the 2G RAT, or the Wi-Fi RAT. In an aspect, the apparatus further includes means for determining that the modified power parameter satisfies a reporting threshold, and the means for providing the measurement report includes means for providing the measurement report based on determining that the modified power parameter satisfies the reporting threshold. In an aspect, the first RAT is different from the second RAT. In an aspect, the communication is received from a serving base station associated with the first RAT, and the second RAT is associated with a neighbor base station, and the means for providing the measurement report includes means for providing the measurement report to the serving base station for the handover to the neighbor base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The following detailed description of example aspects refers to the accompanying drawings. The same reference numbers in different drawings may identify the same or similar elements.

Techniques are described in which a high gain user equipment (UE) may undergo an inter-radio access technology (inter-RAT) handover from a first radio access technology (RAT) to a second RAT. To determine whether to perform a handover, a network may obtain a measurement report, from the UE, that includes one or more measurement parameters, such as a power parameter (e.g., a measurement of a received signal power, a reference signal received power (RSRP) parameter, a received signal code power (RSCP) parameter, a received signal strength indicator (RSSI), etc.), a quality parameter (e.g., a measurement of a received signal quality, a reference signal received quality (RSRQ) parameter, a block error rate (BLER), a signal to noise ratio (SINR), etc.), or the like.

The UE may report the measurement parameters for a serving base station (e.g., associated with a first RAT) that is in a communication session with the UE, and may report the measurement parameters for a neighbor base station (e.g., associated with a second RAT). In some cases, the network may initiate the handover when a power parameter, between the UE and the serving base station, falls below a handover threshold. However, this handover threshold may be designed based on a typical power gain (e.g., antenna gain) for a smart phone or a UE with a similar power gain (e.g., approximately −100 decibels (dB)). For a high gain UE that has a higher power gain than a smart phone (e.g., approximately −85 to −90 dB), such as a vehicle antenna, a received signal power may be higher than for a smart phone. In this case, the power parameter may be greater than the handover threshold, and the network may not initiate the handover. As a result, a communication session (e.g., a voice over long term evolution (VoLTE) call, a video over LTE session, etc.) may be dropped when the high gain UE moves from a coverage area of the serving base station to a coverage area of the neighbor base station without a handover from the serving base station to the neighbor base station.

Techniques described herein assist high gain UEs in modifying a power parameter reported to the network. For example, the high gain UE may use another measurement parameter, such as a quality parameter, to determine a quality of a communication with the base station. Based on the quality of the communication, the high gain UE may modify the power parameter, and may report the modified power parameter to the network. By reporting the modified power parameter rather than the true received signal power, the high gain UE may increase the likelihood of a successful handover from a serving base station (e.g., associated with a first RAT) to a neighbor base station (e.g., associated with a second RAT).

Figure 1:
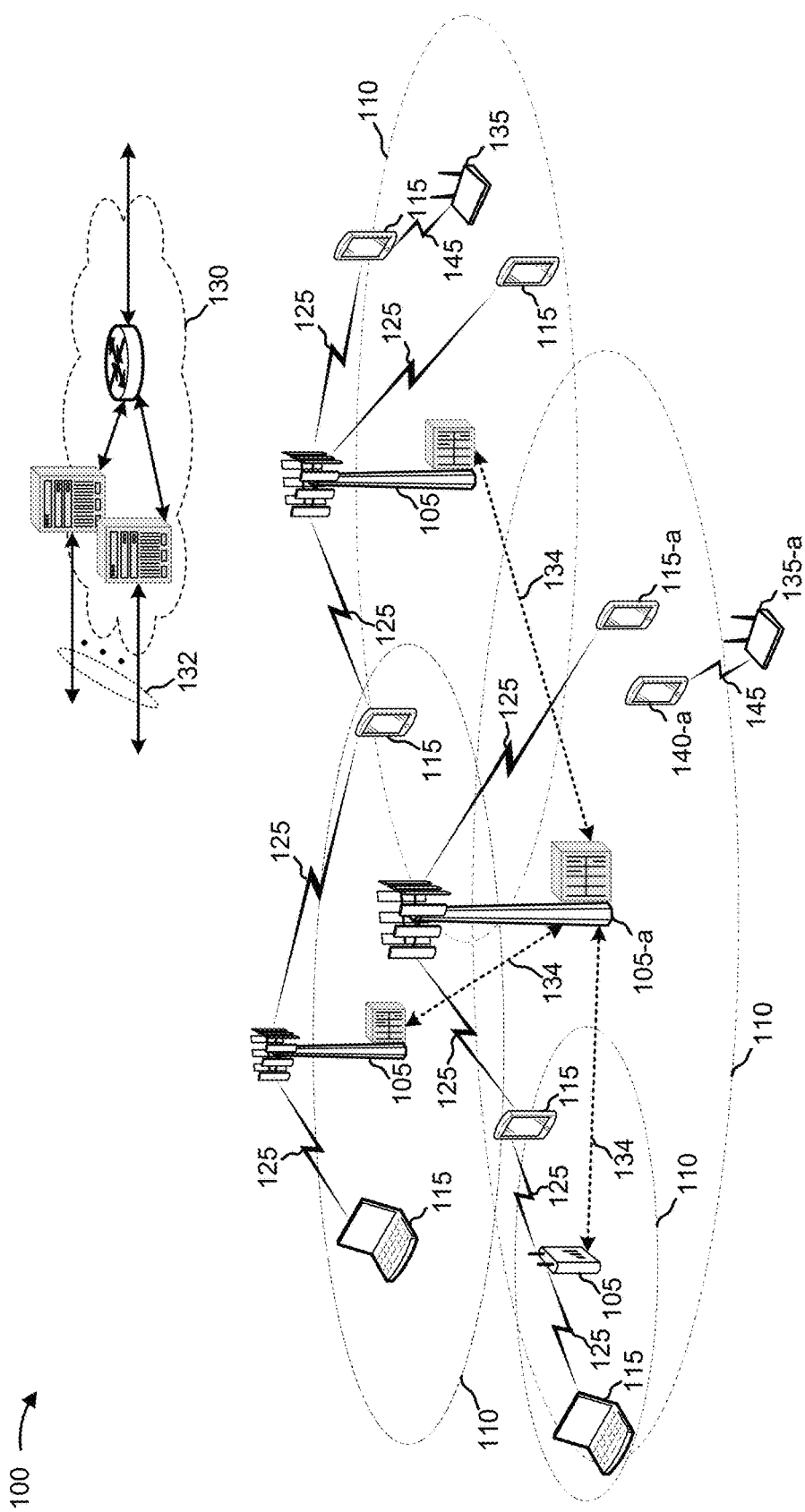
FIG. 1 is an illustration of an example wireless communication system, in accordance with various aspects of the disclosure.

FIG. 1 is an illustration of an example wireless communication system 100, in accordance with various aspects of the disclosure. The wireless communication system 100 may include a cellular network and a Wi-Fi network. The cellular network may include one or more base stations 105, 105-a, one or more UEs 115, 115-a, and a core network 130. The Wi-Fi network may include one or more Wi-Fi access points 135, 135-a and one or more Wi-Fi stations, such as Wi-Fi station 140-a.

With reference to the cellular network of the wireless communication system 100, the core network 130 may provide user authentication, access authorization, tracking, Internet Protocol (IP) connectivity, and other access, routing, or mobility functions. The base stations 105, 105-a may interface with the core network 130 through backhaul links 132 (e.g., S1, etc.) and may perform radio configuration and scheduling for communication with the UEs 115, 115-a, or may operate under the control of a base station controller (not shown). In various examples, the base stations 105, 105-a may communicate, either directly or indirectly (e.g., through core network 130), with each other over backhaul links 134 (e.g., X2, etc.), which may be wired or wireless communication links.

The base stations 105, 105-a may wirelessly communicate with the UEs 115, 115-a via one or more base station antennas. Each of the base station 105, 105-a sites may provide communication coverage for a respective geographic coverage area 110. In some examples, a base station 105, 105-a may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-a may be divided into sectors making up a portion of the coverage area (not shown). The cellular network may include base stations 105, 105-a of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-a, while the term UE may be used to describe the UEs 115, 115-a. The cellular network may be a Heterogeneous LTE/LTE-A network in which different types of eNBs provide coverage for various geographical regions. For example, each eNB or base station 105, 105-a may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-a and the base stations 105, 105-a or core network 130 supporting radio bearers for the user plane data. At the Physical (PHY) layer, the transport channels may be mapped to Physical channels.

The UEs 115, 115-a may be dispersed throughout the wireless communication system 100, and each UE 115, 115-a may be stationary or mobile. A UE 115, 115-a may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-a may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-a and network equipment, including macro eNBs, small cell eNBs, relay base stations, or the like.

The communication links 125 shown in wireless communication system 100 may carry downlink (DL) transmissions from a base station 105, 105-a to a UE 115, 115-a, and/or uplink (UL) transmissions from a UE 115, 115-a to a base station 105, 105-a. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some embodiments of the wireless communication system 100, base stations 105, 105-a and/or UEs 115, 115-a may include multiple antennas for employing antenna diversity schemes to improve communication quality and reliability between base stations 105, 105-a and UEs 115, 115-a. Additionally or alternatively, base stations 105, 105-a and/or UEs 115, 115-a may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-a may be configured with multiple downlink CCs and one or more uplink CCs for carrier aggregation. Carrier aggregation may be used with both FDD and TDD component carriers.

With reference to the Wi-Fi network of the wireless communication system 100, the Wi-Fi access points 135, 135-a may wirelessly communicate with the Wi-Fi stations 140, 140-a via one or more Wi-Fi access point antennas, over one or more communication links 145. In some examples, the Wi-Fi access points 135, 135-a may communicate with the Wi-Fi stations 140, 140-a using one or more Wi-Fi communication standards, such as an Institute of Electrical and Electronics (IEEE) Standard 802.11 (e.g., IEEE Standard 802.11a, IEEE Standard 802.11n, or IEEE Standard 802.11 ac).

In some examples, a Wi-Fi station 140, 140-a may be a cellular phone, a personal digital assistant (PDA), a wireless communication device, a handheld device, a tablet computer, a laptop computer, or the like. In some examples, an apparatus may include aspects of both a UE 115, 115-a and a Wi-Fi station 140, 140-a, and such an apparatus may communicate with one or more base stations 105, 105-a using a first radio access technology (RAT) (e.g., a cellular RAT or multiple cellular RATs), and communicate with one or more Wi-Fi access points 135, 135-a using a second RAT (e.g., a Wi-Fi RAT or multiple Wi-Fi RATs).

In some examples, the base stations 105, 105-a and UEs 115, 115-a may communicate over a licensed radio frequency spectrum band and/or an unlicensed radio frequency spectrum band, whereas the Wi-Fi access points 135, 135-a and Wi-Fi stations 140, 140-a may communicate over the unlicensed radio frequency spectrum band. The unlicensed radio frequency spectrum band may therefore be shared by the base stations 105, 105-a, the UEs 115, 115-a, the Wi-Fi access points 135, 135-a, and/or the Wi-Fi stations 140, 140-a.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
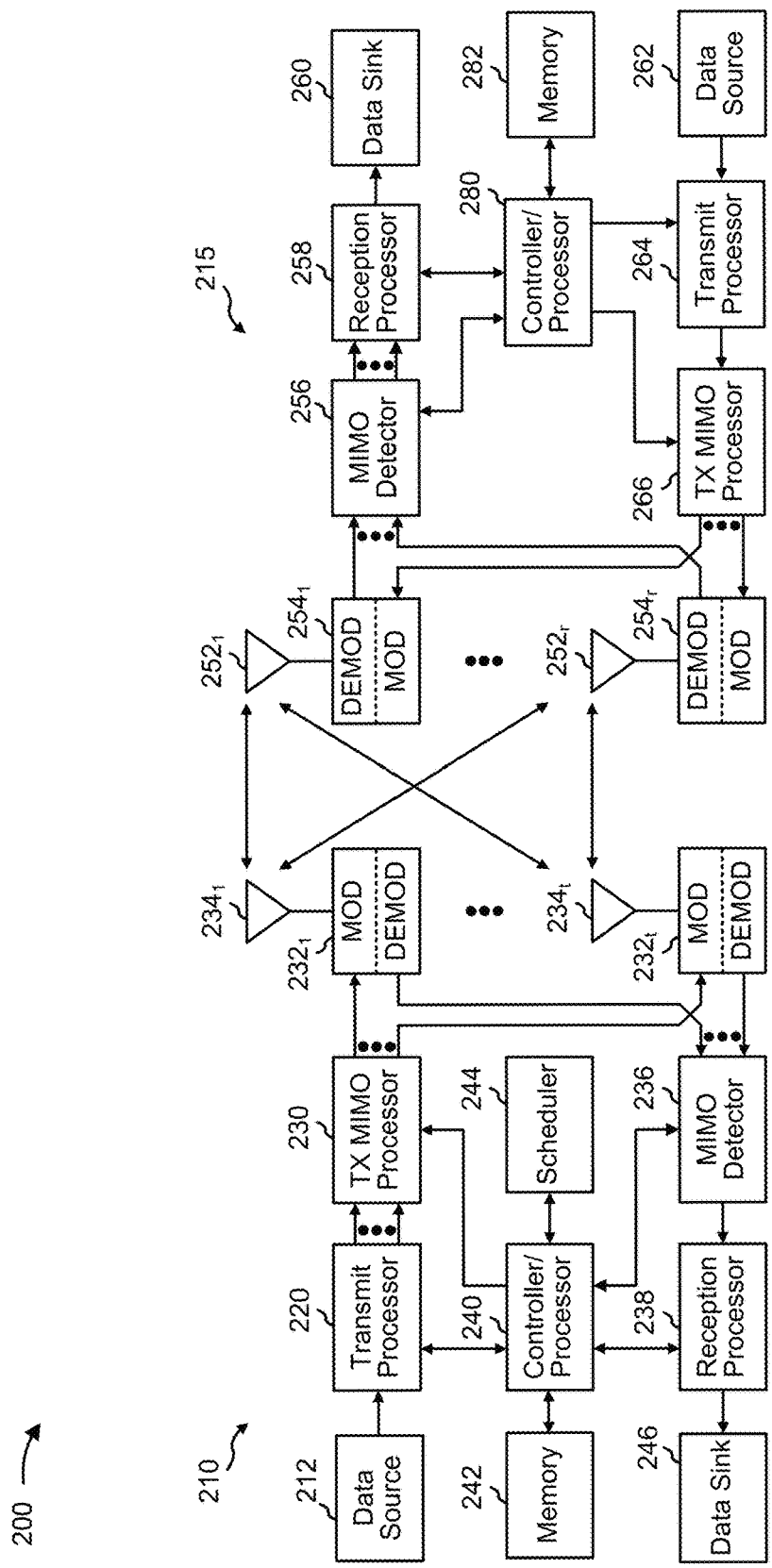
FIG. 2 is an illustration of example components of one or more devices of FIG. 1, in accordance with various aspects of the present disclosure.

FIG. 2 is an illustration of example components of a base station/eNodeB 210 and a UE 215 configured in accordance with an aspect of the present disclosure. For example, base station/eNodeB 210 and UE 215, shown in FIG. 2, may correspond to base station/eNodeB 105 and UE 115, respectively, shown in FIG. 1. Base station 210 may be equipped with antennas $234_{1-t}$, and UE 215 may be equipped with antennas $252_{1-r}$, wherein t and r are integers greater than or equal to one.

At base station 210, a base station transmit processor 220 may receive data from a base station data source 212 and control information from a base station controller/processor 240. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 220 may process (e.g., encode and symbol map) the data and control information to obtain data symbols and control symbols, respectively. Base station transmit processor 220 may also generate reference symbols, e.g., for the PSS, SSS, and cell-specific reference signal (RS). A base station transmit (TX) multiple-input multiple-output (MIMO) processor 230 may perform spatial processing (e.g., precoding) on the data symbols, the control symbols, and/or the reference symbols, if applicable, and may provide output symbol streams to base station modulators/demodulators (MODs/DEMODs) $232_{1-t}$. Each base station modulator/demodulator 232 may process a respective output symbol stream (e.g., for orthogonal frequency-division multiplexing (OFDM), or the like) to obtain an output sample stream. Each base station modulator/demodulator 232 may further process (e.g., convert to ana-log, amplify, filter, and upconvert) the output sample stream to obtain a downlink signal. Downlink signals from modulators/demodulators $232_{1-t}$ may be transmitted via antennas $234_{1-t}$, respectively.

At UE 215, UE antennas $252_{1-r}$ may receive the downlink signals from base station 210 and may provide received signals to UE modulators/demodulators (MODs/DEMODs) $254_{1-r}$, respectively. Each UE modulator/demodulator 254 may condition (e.g., filter, amplify, downconvert, and digitize) a respective received signal to obtain input samples. Each UE modulator/demodulator 254 may further process the input samples (e.g., for OFDM, etc.) to obtain received symbols. A UE MIMO detector 256 may obtain received symbols from all UE modulators/demodulators $254_{1-r}$, and perform MIMO detection on the received symbols, if applicable, and provide detected symbols. A UE reception processor 258 may process (e.g., demodulate, deinterleave, and decode) the detected symbols, provide decoded data for UE 215 to a UE data sink 260, and provide decoded control information to a UE controller/processor 280.

On the uplink, at UE 215, a UE transmit processor 264 may receive and process data (e.g., for the Physical Uplink Shared Channel (PUSCH)) from a UE data source 262 and control information (e.g., for the Physical Uplink Control Channel (PUCCH)) from UE controller/processor 280. UE transmit processor 264 may also generate reference symbols for a reference signal. The symbols from UE transmit processor 264 may be precoded by a UE TX MIMO processor 266, if applicable, may be further processed by UE modulator/demodulators $254_{1-r}$ (e.g., for SC-FDM, etc.), and may be transmitted to base station 210. At base station 210, the uplink signals from UE 215 may be received by base station antennas 234, processed by base station modulators/demodulators 232, detected by a base station MIMO detector 236, if applicable, and further processed by a base station reception processor 238 to obtain decoded data and control information sent by UE 215. Base station reception processor 238 may provide the decoded data to a base station data sink 246 and the decoded control information to base station controller/processor 240.

Base station controller/processor 240 and UE controller/processor 280 may direct the operation at base station 210 and UE 215, respectively. Base station controller/processor 240 and/or other processors and modules at base station 210 may perform or direct, for example, execution of various processes for the techniques described herein. UE controller/processor 280 and/or other processors and modules at UE 215 may also perform or direct, for example, execution of one or more blocks illustrated in FIG. 3B, and/or other processes for the techniques described herein. A base station memory 242 and a UE memory 282 may store data and program codes for base station 210 and UE 215, respectively. A scheduler 244 may schedule UEs 215 for data transmission on the downlink and/or uplink.

In one configuration, base station 210 may include means for generating a compact Downlink Control Information (DCI) for at least one of uplink (UL) or downlink (DL) transmissions, wherein the compact DCI includes a reduced number of bits when compared to certain standard DCI formats; and means for transmitting the DCI. In one aspect, the aforementioned means may be base station controller/processor 240, base station memory 242, base station transmit processor 220, base station modulators/demodulators 232, and/or base station antennas 234 configured to perform the functions recited by the aforementioned means. In another aspect, the aforementioned means may be a module or any apparatus configured to perform the functions recited by the aforementioned means. In one configuration, UE 215 may include means for receiving compact Downlink Control Information (DCI) for at least one of uplink (UL) or downlink (DL) transmissions, wherein the DCI includes a reduced number of bits of a standard DCI format; and means for processing the DCI. In one aspect, the aforementioned means may be UE controller/processor 280, UE memory 282, UE reception processor 258, UE MIMO detector 256, UE modulators/demodulators 254, and/or UE antennas 252 configured to perform the functions recited by the aforementioned means. In another aspect, the aforementioned means may be a module or any apparatus configured to perform the functions recited by the aforementioned means.

Figure 3A:
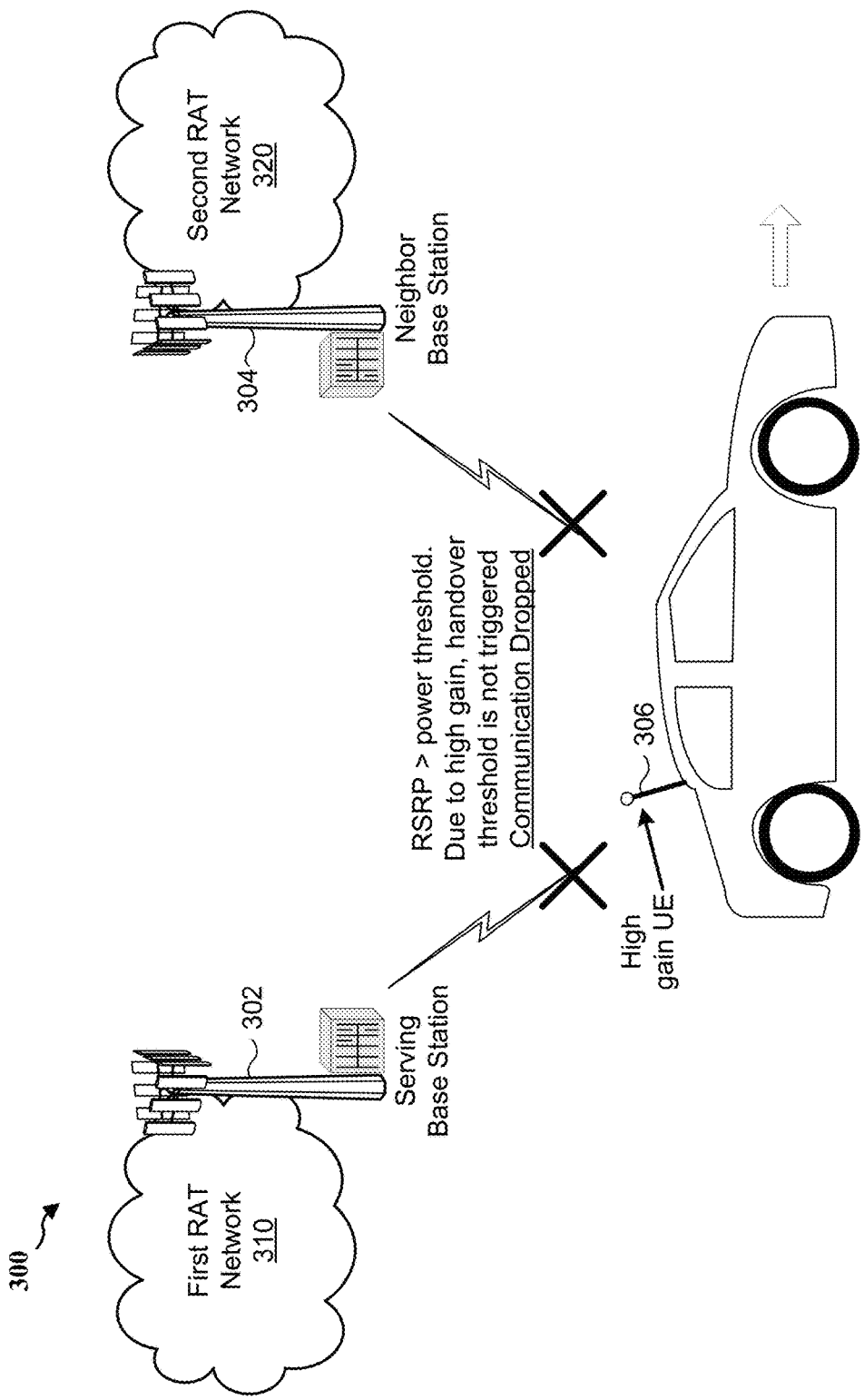
FIG. 3A is a diagram illustrating an example of a user equipment having a high gain antenna, in accordance with various aspects of the disclosure.
Figure 3B:
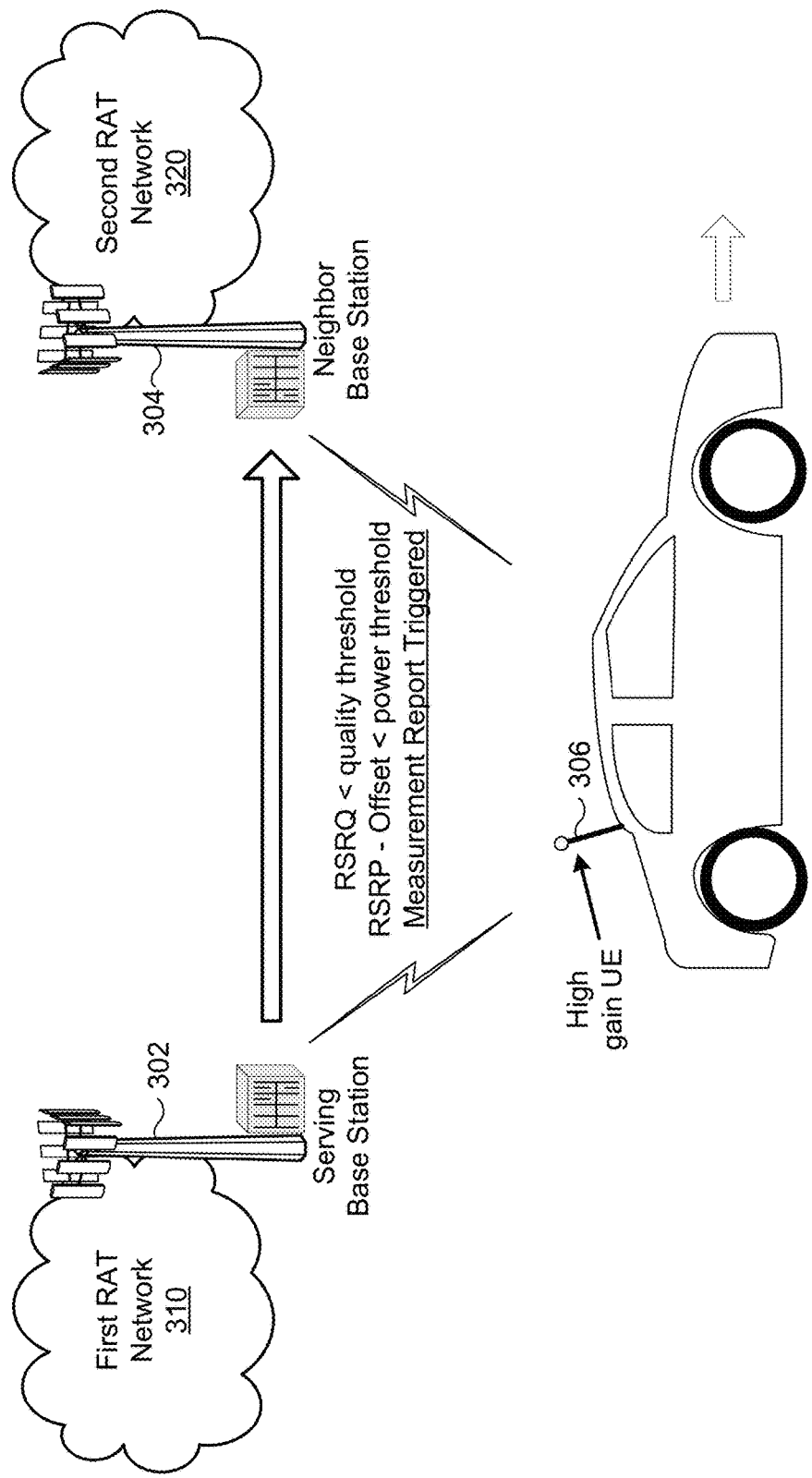
FIG. 3B is a diagram illustrating another example of a user equipment having a high gain antenna, in accordance with various aspects of the disclosure.

FIGS. 3A and 3B are a diagrams illustrating an example of a UE having a high gain antenna (hereinafter, high gain UE) 306 operating in a communications network 300, in accordance with various aspects of the present disclosure. In the aspect of FIG. 3A, a high gain UE 306 is moving from a coverage area associated with a first RAT 310 (e.g., an LTE RAT) to a coverage area associated with a second RAT 320 (e.g., a 3G RAT). In the aspect of FIG. 3A, the high gain UE 306 is a vehicle configured with an antenna for wireless communications in the network 300. In an aspect, the UE 306 in FIGS. 3A and 3B corresponds to UE 115 in FIG. 1. A serving base station 302 associated with first RAT 310 is in a communication session with the high gain UE 306. In an aspect, the serving base station 302 in FIGS. 3A and 3B corresponds to a serving base station 105 in FIG. 1. In FIG. 3A, the high gain UE 306 determines that a power parameter measured based on a received signal power of a communication with serving base station 302 is greater than a power threshold. For example, the power parameter may be an RSRP value. In an aspect, the high gain UE 306 may periodically report the power parameter to serving base station 302. In such a case, serving base station 302 may not initiate a handover to neighbor base station 304 associated with second RAT 320 when the power parameter is greater than a handover threshold used to trigger the handover. In an aspect, the neighbor base station 304 in FIGS. 3A and 3B corresponds to a neighbor base station 105 in FIG. 1. In another example case, the high gain UE 306 may report the power parameter to serving base station 302 when the power parameter is less than a power threshold. In such a case, the high gain UE 306 may fail to report the power parameter early enough for serving base station 302 to be able to initiate the handover to neighbor base station 304. In the example cases described with respect to FIG. 3A, the communication session may be dropped.

In the aspect of FIG. 3B, the high gain UE 306 measures a quality parameter based on a received signal quality of a communication with serving base station 302. For example, the quality parameter may be an RSRQ value. The quality parameter may be a more accurate measure of the quality of the communication session, as opposed to the power parameter. For example, the power parameter may merely measure a received signal power associated with the communication session. In the aspect of FIG. 3B, the high gain UE 306 may modify the power parameter based on the quality parameter. For example, if the quality parameter is less than a quality threshold, then high gain UE 306 may subtract an offset value from the power parameter to determine a modified power parameter. High gain UE 306 may report the modified power parameter to serving base station 302, or may use the modified power parameter to trigger transmission of a measurement report to serving base station 302. In either case, serving base station 302 may initiate a handover earlier in time than had high gain UE 306 not modified the power parameter, resulting in an increased likelihood of a successful handover from serving base station 302 to neighbor base station 304. Therefore, by modifying the power parameter, the high gain UE 306 may increase the likelihood of a successful handover from first RAT 310 to second RAT 320, and may decrease the likelihood of a dropped communication session (e.g., a dropped call, a dropped data session, etc.)

By way of example, all devices operating in conformance with one or more technical specifications promulgated by 3GPP are to operate with the same set of cell selection/reselection and handover parameters. In the context of various wireless communication standards (e.g., LTE, LTE-A, 3G, and the like), measurement reporting may be based on events, such as Event A2 and/or Event B2.

According to an aspect, a first event (e.g., Event A2) may be triggered when the measured power parameter associated with the serving base station 302 minus a hysteresis value is greater than a threshold. A second event (e.g., Event B2) may be triggered when both the measured power parameter associated with the serving base station 302 plus a hysteresis value is less than a first threshold and a second power parameter measured for a neighbor base station (e.g., the neighbor base station 304) plus an offset minus a hysteresis value is greater than a second threshold. The offset, hysteresis value(s), and threshold values, may be configured through signaling to the high gain UE 306, such as through RRC signaling (e.g., RRC connection/reconfiguration message(s)).

In aspects, the high gain UE 306 may be configured to send a first measurement report based on the triggering of the first event. Based on the first measurement report, the serving base station 302 may signal, to the high gain UE 306, one or more values associated with the second event, such as an offset, a first threshold, a second threshold, and the like. Thus, the high gain UE 306 may detect occurrence of the second event based on comparison of measurements (e.g., a measured power parameters from a serving base station and a neighboring base station) to values that are based on one or more parameters signaled to the high gain UE 306. However, because the values signaled to the high gain UE 306 are configured for handover initiation with respect to a conventional UE, measurement reporting may be triggered too late for a successful handover for the high gain UE 306 (e.g., as described with respect to FIG. 3A).

In various aspects, the high gain UE 306 may be configured to adjust the power parameter of the high gain UE 306, for example, so that measurement reporting is triggered at an earlier point and handover from the serving base station to the neighbor base station 304 may be more likely to succeed.

In aspects, the high gain UE 306 may determine that an offset is to be applied to the power parameter to form a modified power parameter. The offset may be a value that, when applied to the power parameter, increases the likelihood that the power parameter will satisfy a handover threshold used to trigger handover of the high gain UE 306 from the serving base station 302 to the neighbor base station 304. For example, the serving base station 302 (or another network device) may initiate handover of the high gain UE 306 when the power parameter is less than a handover threshold. In such an aspect, applying the offset may lower the power parameter (e.g., via subtraction, division, etc.) so that the modified power parameter is more likely to satisfy the handover threshold.

In one aspect, the offset may include a preconfigured value. Additionally, or alternatively, the offset may be reconfigurable. In some aspects, the high gain UE 306 may be configured to calculate or reconfigure the offset, for example, based on network conditions, a power gain of the high gain UE 306, and the like. In one aspect, the high gain UE 306 may be configured to reconfigure the offset based on an instruction from a base station (e.g., the serving base station 302).

In some aspects, the high gain UE 306 may calculate the offset based on one or more quality parameters. For example, the high gain UE 306 may be configured to use a mathematical function to calculate the offset based on one or more an RSRQ value, a BLER value, an Ec/Io value, or the like. In some aspects, the high gain UE 306 may calculate the offset as a value that is inversely proportional to the quality parameter. For example, when the received signal quality is high (e.g., an RSRQ value is high, a BLER value is low, an Ec/Io value is high, etc.). Conversely, when the received signal quality is low, the high gain UE 306 may configure the offset to be a higher value. In this way, the high gain UE 306 may increase the likelihood of a successful handover when the received signal quality is low and may decrease the likelihood of an unnecessary handover when the received signal quality is high.

Additionally, or alternatively, the high gain UE 306 may be configured to calculate the offset based on a power gain of the high gain UE 306. For example, the high gain UE 306 may be configured to use a mathematical function to calculate the offset using the power gain. In some aspects, the high gain UE 306 may be configured to calculate the offset as a value that is proportional to the power gain. By way of example, when the power gain is high, the high gain UE 306 may calculate the offset to be a higher value and when the power gain is low, the high gain UE 306 may calculate the offset to be a lower value. In this way, the high gain UE 306 may increase the likelihood of handover (e.g., by decreasing the modified power parameter) when the power gain of the high gain UE 306 is high.

In another illustrative aspect, the high gain UE 306 may calculate the offset based on switching between a first antenna (e.g., an internal antenna) and a second antenna (e.g., an external antenna) and computing a path loss difference. In another aspect, the high gain UE 306 may switch between a offsets of a plurality of preconfigured offsets, for example, based on RSSI (e.g., low, middle, and high regions associated with RSSI). In a further aspect, the high gain UE 306 may be configured to calculate the offset based on a maximum transmission power value, an uplink BLER, or a combination of the two. The high gain UE 306 may employ a combination of the aforementioned techniques or additional techniques to calculate an offset and/or switch between offsets.

In some aspects, the high gain UE 306 may have a power gain in a range of approximately ten (10) to fifteen (15) dB higher than a convention UE (e.g., a low gain UE). Thus, the offset may be calculated to be within a range of approximately 10 db to 15 dB (e.g., for an offset to be subtracted from the power parameter) or −15 dB to −10 dB (e.g., for an offset to be added to the power parameter). For example, the power gain of the high gain UE 306 may be −90 dB and, therefore, the high gain UE 306 may offset the power parameter by 10 dB (e.g., by subtracting 10 dB from the power parameter) so that the modified power parameter is equal to the 100 dB that may be used by a conventional UE for measurement reporting. In another example, the high gain UE 306 may determine that the power gain of the high gain UE 306 is −85 dB and the high gain UE 306 offset the power parameter by 15 dB. In some aspects, the high gain UE 306 may determine a difference between approximately −100 dB and a power gain of the high gain UE 306 and may offset the power parameter by this difference. By modifying the power parameter by the offset and by reporting the modified power parameter to the base station (e.g., the serving base station 302), the base station may treat the high gain UE 306 (e.g., a car antenna) as a conventional UE (e.g., a smart phone or other low gain UE) for handover purposes.

According to aspects, the high gain UE 306 may be configured to apply the offset to the power parameter based on comparison of the at least one quality parameter to the at least one quality threshold (e.g., if the quality parameter meets or exceeds the quality threshold). In further aspects, the high gain UE 306 may compare a plurality of quality parameters to a plurality of quality thresholds. For example, the high gain UE 306 may be configured to determine whether an RSRQ value is less than a first threshold and whether a BLER value is greater than a second threshold. In another aspect, the high gain UE 306 may combine a plurality of quality parameters to form a combined quality parameter (e.g., based on a mathematical function) and compare the combined quality parameter to a quality threshold. Additionally, or alternatively, the high gain UE 306 may be configured to apply a weight to one or more quality parameters (e.g., when combining multiple quality parameters) and may compare one or more weighed quality parameters to one or more quality thresholds.

The one or more quality thresholds may be one or more preconfigured values. In another aspect, the high gain UE 306 may be configured to calculate the one or more quality thresholds, for example, based on network conditions, a power gain of the high gain UE 306, or the like. In one aspect, the high gain UE 306 may be configured to modify the quality threshold based on an instruction from a base station (e.g., the serving base station 302).

In one aspect, the high gain UE 306 may be configured to apply the offset to the power parameter based on a power gain of the high gain UE 306. This configuration may be in addition to or an alternative to application of the offset to the power parameter based on a quality parameter. For example, the high gain UE 306 may be configured to determine the power gain of the high gain UE 306. The high gain UE 306 may compare the determined power gain to a power gain threshold. Based on comparison of the determined power gain to the power gain threshold (e.g., when the power gain meets or exceeds the power gain threshold), the high gain UE 306 may apply the offset to the power parameter. In such a case, the high gain UE 306 may modify the power parameter to increase the likelihood of a successful handover when the power gain of the high gain UE 306 is high (e.g., where, without modification of the power parameter, handover may not be initiated until a point at which handover fails). In some aspects, the high gain UE 306 may be configured to determine the power gain of the high gain UE 306 where, for example, the high gain UE 306 communicates using a plurality of antennas or antenna arrays (e.g., an internal antenna and an external antenna), which the high gain UE 306 may switch between.

In aspects, the high gain UE 306 may provide the modified power parameter to a network device that is included in or communicatively coupled with a core network (e.g., the serving base station 302, the neighbor base station 304, an MME, or the like), and the network device may use the measurement report in association with handover of the high gain UE 306 from the serving base station 302 to the neighbor base station 304 (e.g., the network device may initiate handover of the high gain UE 306 if the modified power parameter satisfies a handover threshold or the network device may signal additional parameters for measurement reporting associated with handover to the high gain UE 306). For example, the high gain UE 306 may transmit a measurement report that includes the modified power parameter (e.g., instead of the measured power parameter) in a measurement report. The high gain UE 306 may further include other values in a measurement report, such as the quality parameter, the power gain, and/or values measured for the neighbor base station 304.

In one aspect, the high gain UE 306 may periodically provide a measurement report (including the modified power parameter) to a network device (e.g., the serving base station 302). In another aspect, the high gain UE 306 may provide measurement report (including the modified power parameter) to a network device (e.g., the serving base station 302) based on an event (e.g., an Event A2 and/or Event B2 as described in one or more 3GPP technical specifications). In various aspects, the event may include comparison of the modified power parameter (and/or the quality parameter) to a reporting threshold.

The reporting threshold may include a preconfigured value. Additionally, or alternatively, the reporting threshold may be reconfigurable. In some aspects, the reporting threshold may be set to a value based on, for example, network conditions, a power gain of the high gain UE 306, or the like. In some aspects, the high gain UE 306 may receive an instruction from a base station (e.g., the serving base station 302) and may configure the reporting threshold based on the instruction from the base station.

In aspects, the high gain UE 306 may be configured to send a first measurement report based on the triggering of the first event. For example, the high gain UE 306 may be configured to transmit the modified power parameter when the modified power parameter minus a hysteresis value is greater than a reporting threshold.

By way of example, the high gain UE 306 may be configured to send the first measurement report based on Event A2; however, the modified power parameter may cause the high gain UE 306 to transmit the first measurement report at a point in time that is earlier than the point at which the high gain UE 306 would transmit the first measurement report if the high gain UE 306 were not to use the modified power parameter to detect occurrence of Event A2 (e.g., if the high gain UE 306 were to use the measured power parameter). Because the serving base station 302 may communicate a configuration for Event B2 to the high gain UE 306 based on reception of the Event A2, the serving base station 302 may signal the Event B2 configuration at a point earlier in time. The earlier reception of the Event B2 configuration at the high gain UE 306 may increase the chance that the first threshold for Event B2 will be satisfied and, therefore, increase the chance of successful handover.

In some aspects, the high gain UE 306 may additionally use a second modified power parameter to determine if Event B2 is triggered and/or may include the second modified power parameter in the measurement report triggered by Event B2. For example, the high gain UE 306 may measure a second power parameter for the neighbor base station 304. The high gain UE 306 may measure a second quality parameter for the neighbor base station 304, and the high gain UE 306 may apply an offset to the second measured power parameter to form a second modified power parameter in a manner similar to that described herein with respect to the serving base station 302. However, in other aspects, the high gain UE 306 may only modify one or more power parameters for a serving base station and/or for a particular RAT (e.g., only modify LTE power parameters when handing over to 3G).

Figure 4:
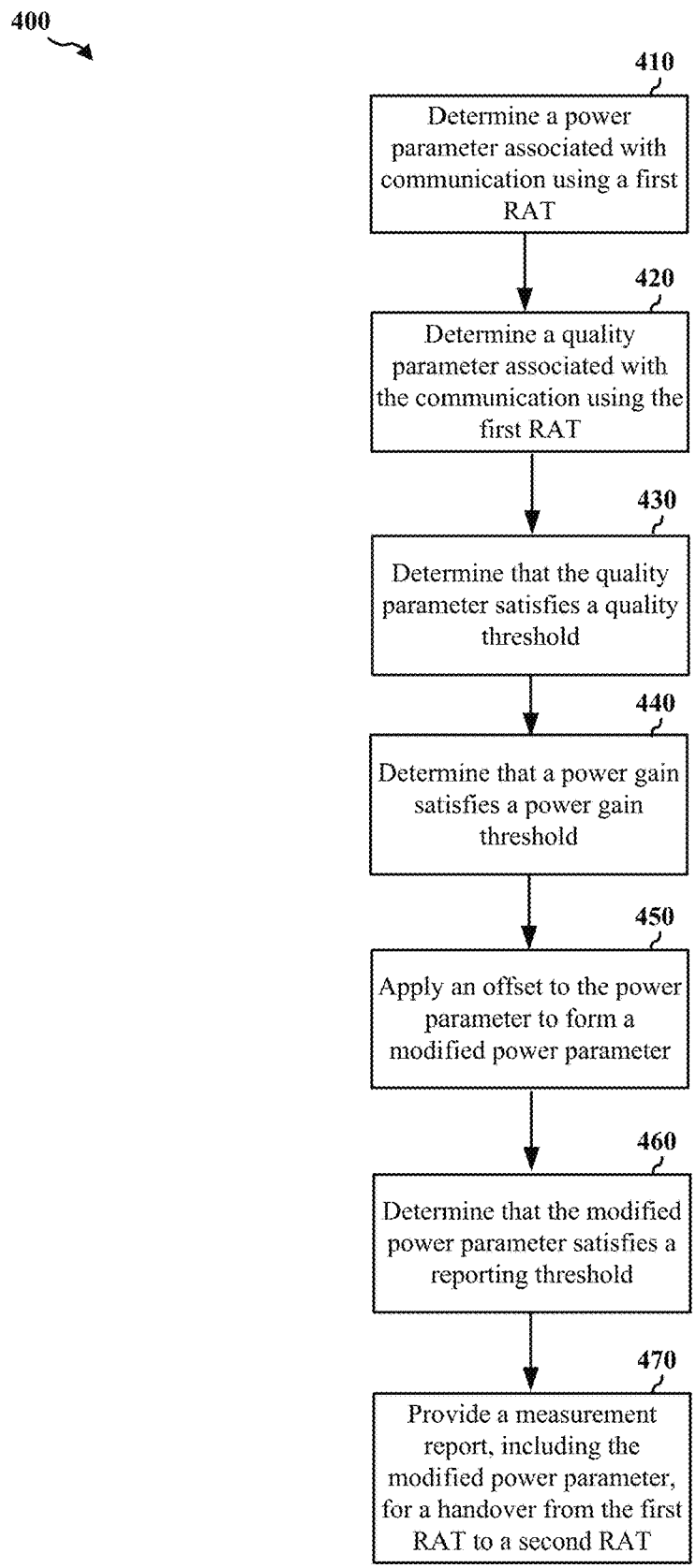
FIG. 4 is a flow chart 400 of a method of wireless communication, in accordance with various aspects of the disclosure.

FIG. 4 is a flow chart 400 of a method of wireless communication in accordance with various aspects of the disclosure. In an aspect, the method may be performed by a UE, such as UE 115 or UE 306.

As shown in FIG. 4, at 410, the UE determines a power parameter associated with a communication using a first RAT. For example, the UE may measure a received signal power of one or more communications using a first RAT, and may determine a power parameter that represents the received signal power. In some aspects, the UE may receive the one or more communications from a serving base station (e.g., serving base station 302) with which the UE is communicating for a voice call (e.g., a VoLTE call), a video call, a data session, or the like. The serving base station may use a first RAT to communicate with the UE. The first RAT may include, for example, a 4G RAT, a 3G RAT, a 2G RAT, a LTE RAT, an LTE-Advanced (LTE-A) RAT, a Wi-Fi RAT, or the like.

The UE may determine a power parameter associated with the one or more communications. In some aspects, the power parameter may represent a measurement of received signal power. For example, the power parameter may represent an RSRP, an RSCP, an RSSI, a ratio of a received energy per chip (e.g., code bit) to an interference level (Ec/Io), or the like. In some aspects, the power parameter may be represented using a value, such as a decibel value (e.g., a received signal power value, an RSRP value, an RSCP value, an RSSI value, an Ec/Io value, etc.).

In some aspects, the UE may determine the power parameter as part of a reporting process used for handover of UE from the serving base station to a neighbor base station (e.g., neighbor base station 304). In some aspects, the serving base station may be associated with a first RAT and neighbor base station may be associated with a second RAT. The second RAT may include, for example, a 4G RAT, a 3G RAT (e.g., Universal Mobile Telecommunications System (UMTS), High Speed Packet Access (HSPA), Code Division Multiple Access (CDMA), etc.), a 2G RAT, an LTE RAT, an LTE-A RAT, a Wi-Fi RAT, or the like. In some aspects, the first RAT may be different from the second RAT. In this case, the handover may include an inter-RAT handover.

At 420, the UE determines a quality parameter associated with the communication using the first RAT. For example, the UE may measure a received signal quality of one or more communications using the first RAT, and may determine a quality parameter that represents the received signal quality. In some aspects, the UE may receive the one or more communications from the serving base station as previously described.

The UE may determine a quality parameter associated with the one or more communications. In some aspects, the quality parameter may represent a measurement of received signal quality. For example, the quality parameter may represent an RSRQ, a BLER, an SINR, or the like. In some aspects, the quality parameter may be represented using a value, such as a decibel value (e.g., a received signal quality value, an RSRQ value, a BLER value, an SINR value, etc.). In some aspects, the UE may determine multiple quality parameters (e.g., an RSRQ value and a BLER value, an RSRQ value and an SINR value, a BLER value and an SINR value, etc.).

In some aspects, the UE may use the quality parameter to modify the power parameter, and may report the modified power parameter to the serving base station for a handover.

Additionally, or alternatively, the UE may use the quality parameter to determine whether to provide a measurement report to the serving base station for the handover. When the UE is a high gain UE (e.g., with a power gain that satisfies a power gain threshold), then using the received signal quality in this way may increase the likelihood of a successful handover.

At 430, the UE determines that the quality parameter satisfies a quality threshold. For example, the UE may determine that the quality parameter (e.g., an RSRQ value, a BLER value, an SINR value, etc.) satisfies a quality threshold. In some aspects, the UE may use the quality threshold to determine whether to modify the power parameter. In some aspects, the UE may use the quality threshold to determine whether to provide a measurement report to the serving base station.

In some aspects, the quality threshold may include a preconfigured value. Additionally, or alternatively, the quality threshold may be reconfigurable. In some aspects, the quality threshold may be set to a value based on, for example, network conditions, a power gain of the UE, or the like. In an aspect, the UE may receive an instruction from a base station (e.g., the serving base station) to modify the quality threshold. In such aspect, the UE may modify the quality threshold based on the instruction.

The UE may compare the quality parameter and the quality threshold to determine whether the quality parameter satisfies the quality threshold. In an aspect, the UE may determine that the quality parameter satisfies the quality threshold when the quality parameter is less than or equal to the quality threshold. For example, the UE may determine whether an RSRQ value is less than or equal to the quality threshold.

Additionally, or alternatively, the UE may compare multiple quality parameters to multiple quality thresholds. In this case, the UE may determine whether a first quality parameter satisfies a first quality threshold, whether a second quality parameter satisfies a second quality threshold, and so on. For example, the UE may determine whether the RSRQ value is less than a first threshold, and may determine whether the BLER value is greater than a second threshold.

In some aspects, the UE may combine multiple quality parameters (e.g., using a mathematical function) to form a combined parameter, and may compare the combined parameter to a quality threshold. Additionally, or alternatively, the UE may apply a weight to one or more quality parameters (e.g., when combining multiple quality parameters), and may compare a resulting parameter to a quality threshold.

At 440, the UE determines that a power gain satisfies a power gain threshold. For example, the UE may determine a power gain of the UE (e.g., an antenna gain of the UE or a power gain of a receiver of the UE that receives communications). The UE may determine whether the power gain satisfies a power gain threshold. In an aspect, the UE may determine that a power gain satisfies a power gain threshold when the power gain is greater than the power gain threshold. If the power gain satisfies the power gain threshold, the UE may modify a power parameter reported to the serving base station for a handover. Without such modification, the serving base station may fail to handover the UE to the neighbor base station.

In some aspects, the power gain threshold may include a preconfigured value. Additionally, or alternatively, the power gain threshold may be reconfigurable. In some aspects, the power gain threshold may be set to a value based on, for example, network conditions, a power gain of the UE, or the like. In some aspects, the UE may receive an instruction from a base station (e.g., from the serving base station) to modify the power gain threshold. In such aspects, the UE may modify the power gain threshold based on the instruction.

In some aspects, where the UE is a low gain UE, such as a smart phone, the UE may have a power gain of approximately −100 dB. In some aspects, where the UE is a high gain UE, such as a vehicle with an antenna (e.g., a car with a roof-top antenna), or the like, may have a power gain in a range of approximately −90 dB to −85 dB. In other words, a high gain UE may have a power gain in a range of approximately 10 dB to approximately 15 dB higher than a low gain UE. In this case, and as an example, the UE may set a power gain threshold to −100 dB, −95 dB, −90 dB, or the like.

At 450, the UE applies an offset to the power parameter to form a modified power parameter. For example, the UE may apply an offset (e.g., an offset value) to the power parameter (e.g., an RSRP value, an RSCP value, an Echo value, an RSSI value, etc.) to determine a modified power parameter.

The offset may include a value that, when applied to the power parameter, increases the likelihood that the power parameter will satisfy a handover threshold used to trigger handover of the UE from the serving base station to the neighbor base station. For example, the serving base station (or another network device) may initiate the handover when the power parameter is less than a handover threshold. In this case, applying the offset may lower the power parameter (e.g., via subtraction, division, etc.) so that the modified power parameter is more likely to satisfy the handover threshold.

In some aspects, the UE may apply the offset based on determining that the quality parameter satisfies the quality threshold. In this way, the UE may modify the power parameter to increase the likelihood of a handover when the quality of a communication session with the serving base station deteriorates. Additionally, or alternatively, the UE may apply the offset based on determining that the power gain satisfies the power gain threshold. In this case, the UE may modify the power parameter to increase the likelihood of a handover when the UE is a high gain UE (e.g., which, without modifying the power parameter, may not be handed over).

In some aspects, the offset may include a preconfigured value. Additionally, or alternatively, the offset may be reconfigurable. In some aspects, the offset may be set to a value based on, for example, network conditions, a power gain of the UE, or the like. In some aspects, the UE may receive an instruction from a base station (e.g., from the serving base station) to modify the offset. In such aspects, the UE may modify the offset based on the instruction.

In some aspects, the UE may calculate the offset based on one or more quality parameters. For example, the UE may use a mathematical function to calculate the offset using one or more of the RSRQ value, the BLER value, the Ec/Io value, the RSSI value, or the like. In some aspects, the UE may calculate the offset as a value that is inversely proportional to the quality parameter. As an example, when the received signal quality is high (e.g., when an RSRQ value is high, when a BLER value is low, when an Ec/Io value is high, when an RSSI value is high, etc.), the UE may set the offset to a lower value. Conversely, when the received signal quality is low, the UE may set the offset to a higher value. In this way, the UE may increase the likelihood of a handover (e.g., by decreasing the modified power parameter) when the received signal quality is low, and may decrease the likelihood of a handover when the received signal quality is high.

Additionally, or alternatively, the UE may calculate the offset based on a power gain of the UE. For example, the UE may use a mathematical function to calculate the offset using the power gain. In some aspects, the UE may calculate the offset as a value that is proportional to the power gain. As an example, when the power gain is high (e.g., when the UE is a high gain UE, when the power gain is greater than a threshold, etc.), the UE may set the offset to a higher value. Conversely, when the power gain is low (e.g., when the UE is not a high gain UE, when the power gain is less than a threshold, etc.), the UE may set the offset to a lower value. In this way, the UE may increase the likelihood of a handover (e.g., by decreasing the modified power parameter) when the power gain of the UE is high.

In some aspects, and as explained above, a high gain UE may have a power gain in a range of approximately 10 dB to approximately 15 dB higher than a low gain UE. In this case, and as an example, the offset may be set within a range of approximately 10 dB to approximately 15 dB (e.g., when the offset is subtracted from the power parameter), or may be set within a range of approximately −15 dB to approximately −10 dB (e.g., when the offset is added to the power parameter).

As an example, if the UE determines that the power gain of the UE is equal to −90 dB, then the UE may offset the power parameter by 10 dB (e.g., by subtracting 10 dB from the power parameter). As another example, if the UE determines that the power gain of the UE is equal to −85 dB, then the UE may offset the power parameter by 15 dB. In some aspects, the UE may determine a difference between approximately −100 dB and a power gain of the UE, and may offset the power parameter by this difference. By modifying the power parameter by the offset and by reporting the modified power parameter to the base station (e.g., the serving base station), the base station may treat the high gain UE (e.g., a car antenna) like a low gain UE (e.g., a smart phone) for handover purposes.

At 460, the UE determines that the modified power parameter satisfies a reporting threshold. For example, the UE may determine whether the modified power parameter (e.g., the power parameter modified by the offset) satisfies a reporting threshold. If the modified power parameter satisfies the reporting threshold (e.g., if the modified power parameter is less than the reporting threshold), then the UE may provide a measurement report to the serving base station.

In some aspects, the reporting threshold may include a preconfigured value. Additionally, or alternatively, the reporting threshold may be reconfigurable. In some aspects, the reporting threshold may be set to a value based on, for example, network conditions, a power gain of the UE, or the like. In some aspects, the UE may receive an instruction from a base station (e.g., from the serving base station) to modify the reporting threshold. In such aspects, the UE may modify the reporting threshold based on the instruction.

At 470, the UE provides a measurement report, including the modified power parameter, for a handover from the first RAT to a second RAT. For example, the UE may provide the measurement report to a core network (e.g., via the serving base station, a neighbor base station, etc.). In some aspects, the UE may include the modified power parameter in the measurement report. Additionally, or alternatively, the UE may include one or more other parameters in the measurement report, such as the quality parameter, the power gain, or the like. Additionally, or alternatively, the UE may include one or more parameters (e.g., a power parameter, a quality parameter, etc.), associated with a communication from a neighbor base station, in the measurement report.

In some aspects, the UE may provide the measurement report based on determining that the modified power parameter satisfies the reporting threshold, as described above. Additionally, or alternatively, the UE may periodically provide the measurement report (e.g., including the modified power parameter).

A network device (e.g., serving base station, neighbor base station, a mobility management entity (MME), another network device, etc.), included in the core network, may use the measurement report to determine whether to handover the UE from the serving base station to a neighbor base station. For example, the network device may determine to handover the UE when the reported power parameter (in this case, the modified power parameter) satisfies a handover threshold (e.g., is less than a handover threshold).

As discussed above, the serving base station and neighbor base station may be associated with different RATs. In this way, when the UE is a high gain UE, the UE may modify a power parameter to increase the likelihood of a successful inter-RAT handover and to decrease the likelihood of a dropped communication session.

It should be understood that flow chart 400 may include additional blocks, fewer blocks, different blocks, or differently arranged blocks than those depicted in FIG. 4. Additionally, or alternatively, two or more of the blocks in FIG. 4 may be performed in parallel.

Figure 5:
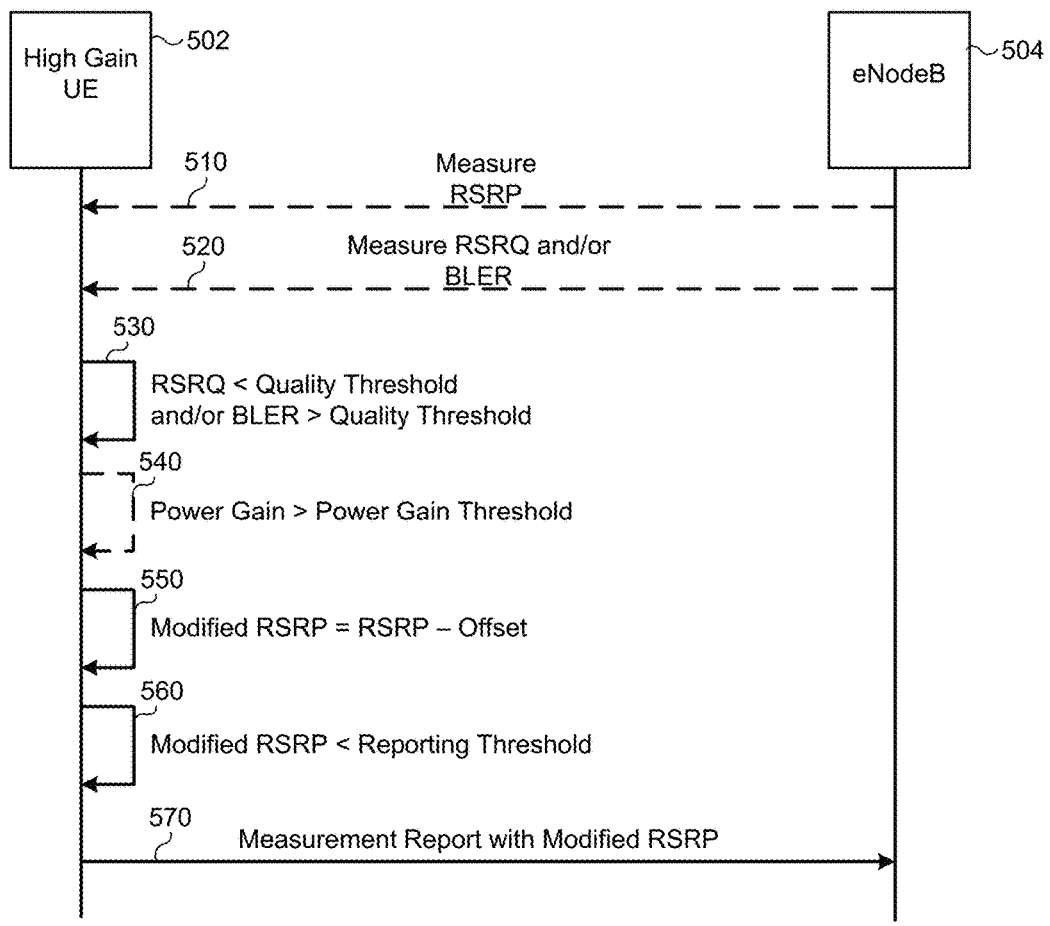
FIG. 5 is an illustration of an example call flow diagram for inter-radio access technology handover, in accordance with various aspects of the disclosure.

FIG. 5 is an illustration of an example call flow diagram 500 relating to the method of wireless communication shown in FIG. 3B. FIG. 5 includes a high gain UE 502 and an eNodeB 504. In an aspect, the high gain UE 502 corresponds to the high gain UE 306 in FIG. 3B and the eNodeB 504 corresponds to the serving base station 302 in FIG. 3B.

As shown by reference number 510, the UE 502 may measure an RSRP (e.g., to determine an RSRP parameter) of a communication with eNodeB 504. As shown by reference number 520, the UE 502 may also measure an RSRQ and/or a BLER of a communication with eNodeB 504. As shown by reference number 530, UE 502 may determine that the measured RSRQ (e.g., an RSRQ parameter) is less than a quality threshold, and/or may determine that the measured BLER is greater than a quality threshold. In other words, the UE 502 may determine that a quality parameter satisfies a quality threshold (e.g., that a first quality parameter is less than a first quality threshold, that a second quality parameter is greater than a second quality threshold, etc.).

As shown by reference number 540, the UE 502 determines that a power gain of the UE 502 is greater than a power gain threshold. Based on determining that the quality parameter satisfies the quality threshold, and based on determining that the power gain satisfies the power gain threshold, the UE 502 may modify an RSRP parameter, determined based on the measured RSRP, using an offset. For example, the UE 502 may subtract an offset value from the RSRP parameter to determine a modified RSRP parameter (shown as "Modified RSRP"), as shown by reference number 550.

As shown by reference number 560, the UE 502 may determine that the modified RSRP parameter is less than a reporting threshold. Based on determining that the modified RSRP parameter is less than the reporting threshold, the UE 502 may provide the measurement report, including the modified RSRP parameter, to the eNodeB 504, as illustrated by reference number 570. Additionally, or alternatively, the UE 502 may periodically provide the measurement report, including the modified RSRP parameter, to the eNodeB 504 regardless of whether the modified RSRP parameter is less than the reporting threshold. In this way, the eNodeB 504 may use the modified RSRP parameter to determine whether to handover the high gain UE 502 to a neighbor base station, thereby increasing the likelihood the high gain UE 502 is successfully handed over.

Although FIG. 5 shows example operations of call flow diagram 500, in some aspects, call flow diagram 500 may include additional operations, fewer operations, different operations, or differently arranged operations than those depicted in FIG. 5. Additionally, or alternatively, two or more of the operations of call flow diagram 500 may be performed in parallel.

Figure 6:
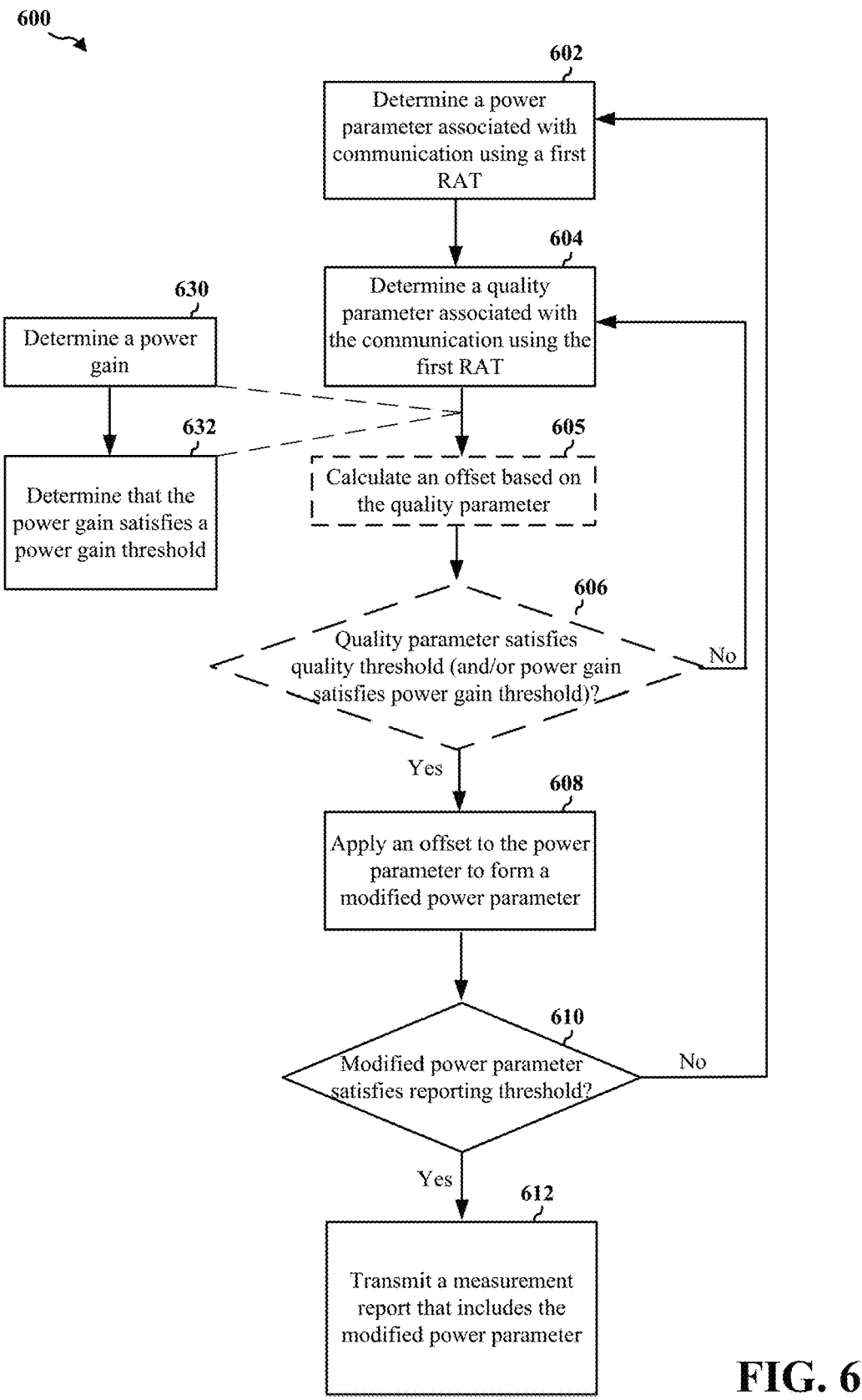
FIG. 6 is a flowchart of a method of wireless communication, in accordance with various aspects of the disclosure.

Now with reference to FIG. 6, a flowchart illustrates a method 600 for modifying a power parameter based on a quality parameter in association with measurement reporting, in accordance with various aspects of the present disclosure. The method 600 may be performed by a UE, and more specifically by a high gain UE (e.g., the high gain UE 306 of FIG. 3B, the apparatus 800/702').

In FIG. 6, various operations are illustrated as optional (e.g., denoted by dashed lines). However, the present disclosure contemplates operations in which one or more operations of the method 600 are optional, omitted, and/or alternatively performed according to various aspects. Further, one or more operations of the method 600 may be transposed and/or contemporaneously performed.

The method 600 may begin with an operation 602 at which a UE may determine a power parameter associated with communication using a first RAT. The power parameter may include a RSRP value, a RSCP value, a RSSI, or another value indicative of a power level of received signals from a network device. The power parameter may be a dB value. In the context of FIG. 3B, the high gain UE 306 may measure a power parameter associated with the serving base station 302, which communicates with the high gain UE 306 using the first RAT 310.

At operation 604, the UE may determine a quality parameter associated with the communication using the first RAT. The quality parameter may include at least one of a RSRQ value, a BLER value, a SINR value, a Ec/Io value, or another value that is indicative of a quality of signals received from a network device. In the context of FIG. 3B, the high gain UE 306 may measure a quality parameter associated with the serving base station 302, which communicates with the high gain UE 306 using the first RAT 310.

In an optional aspect, the method 600 may include operations 630 and 632. At operation 630, the UE may determine a power gain. For example, the UE may determine a power gain of an antenna that the UE is currently using for communication according to the first RAT. In the context of FIG. 3B, the high gain UE 306 may determine the power gain of an antenna of the high gain UE 306 used to communicate with the serving base station 302.

At operation 632, the UE may determine whether the power gain satisfies a power gain threshold. For example, the UE may determine whether the power gain meets or exceeds a power gain threshold. If the power gain does not satisfy the power gain threshold, then the UE may determine that a power parameter for the UE may not need to be modified, and the UE may return to one of the aforementioned operations, such as operation 602 or operation 604. In the context of FIG. 3B, the high gain UE 306 may determine whether power gain of an antenna of the high gain UE 306 satisfies a power gain threshold.

In an optional aspect, the UE may calculate an offset, as illustrated at operation 605. In one aspect, the UE may calculate the offset based on the quality parameter. In another aspect, the UE may switch between a first antenna (e.g., an internal antenna) and a second antenna (e.g., an external antenna) and may compute the path loss as an indication of the gain of the second antenna. In another aspect, the UE may switch between offsets of a plurality of preconfigured offsets based on an RSSI value. In another aspect, the UE may compute the offset based on a maximum transmission power value, an uplink BLER value, or a combination of the two values. In the context of FIG. 3B, the high gain UE 306 may compute an offset for the power parameter measured with respect to the serving base station 302.

In an optional aspect, the UE may determine whether the quality parameter satisfies a quality threshold, as illustrated at operation 606. For example, the UE may determine if the quality parameter meets or exceeds a quality threshold. Alternatively, or additionally, the UE may determine whether the power gain satisfies a power gain threshold (as illustrated at operations 630-632). In the context of FIG. 3B, the high gain UE 306 may determine whether a quality parameter measured for the serving base station 302 satisfies a quality threshold. Alternatively, or additionally, the high gain UE 306 may determine whether the power gain of the high gain UE 306 satisfies a power gain threshold.

If the UE determines that the quality parameter does not satisfy the quality threshold (and/or the power gain does not satisfy the power gain threshold), then the method 600 may return to operation 604, where the UE may again determine a quality parameter (and/or determine a power gain, such as where the UE switches from an internal antenna to an external antenna).

If the UE determines that the quality parameter satisfies the quality threshold (and/or the power gain satisfies the power gain threshold), then the method 600 may advance to operation 608. At operation 608, the UE may apply an offset to the power parameter to form a modified power parameter. The UE may use the modified power parameter where the measured power parameter would normally be used, such as to determine measurement reporting and/or in a field of a measurement report dedicated to the power parameter (e.g., an RSRP field of a measurement report). In the context of FIG. 3B, the high gain UE 306 may apply an offset to the power parameter measured for the serving base station 302.

At operation 610, the UE may determine whether the modified power parameter satisfies a reporting threshold. For example, the UE may determine whether the modified power parameter meets or exceeds a reporting threshold at which measurement reporting is triggered. In the context of FIG. 3B, the UE may determine whether the modified power parameter satisfies a reporting threshold, which may trigger transmission of a measurement report to the serving base station 302 and/or the neighbor base station 304.

In one aspect, the reporting threshold may be associated with an Event A2, which may trigger a measurement report when a power parameter measured for a serving base station becomes worse than a threshold. In another aspect, the reporting threshold may be associated with an Event B2, which may trigger a measurement report when a power parameter measured for a serving base station becomes worse than a first threshold while a power parameter measured for a neighbor inter-RAT base station becomes better than a second threshold.

If the UE determines that the modified power parameter does not satisfy the reporting threshold, then the method 600 may return to operation 602, where the UE may again determine a power parameter. However, if the UE determines that the modified power parameter does satisfy the reporting threshold, the UE may proceed to operation 612.

At operation 612, the UE may transmit a measurement report that includes the modified power parameter. In the context of FIG. 3B, the high gain UE 306 may transmit a measurement report that includes the modified power parameter to the serving base station 302 and/or the neighbor base station 304.

In one aspect, the measurement report may be associated with an Event A2, which may be associated with degradation of communication with the serving base station, such as when a power parameter measured for a serving base station falls below a threshold. In another aspect, the measurement report may be associated with an Event B2, which may be associated with both degradation of communication with a serving base station and improved communication with a neighbor inter-RAT base station, such as when a power parameter measured for a serving base station becomes worse than a first threshold while a power parameter measured for a neighbor inter-RAT base station becomes better than a second threshold. In either Event A2 or Event B2, the UE may use the modified power parameter (measured with respect to a serving base station) both to determine when a measurement report is triggered and to include in the triggered measurement report.

Figure 7:
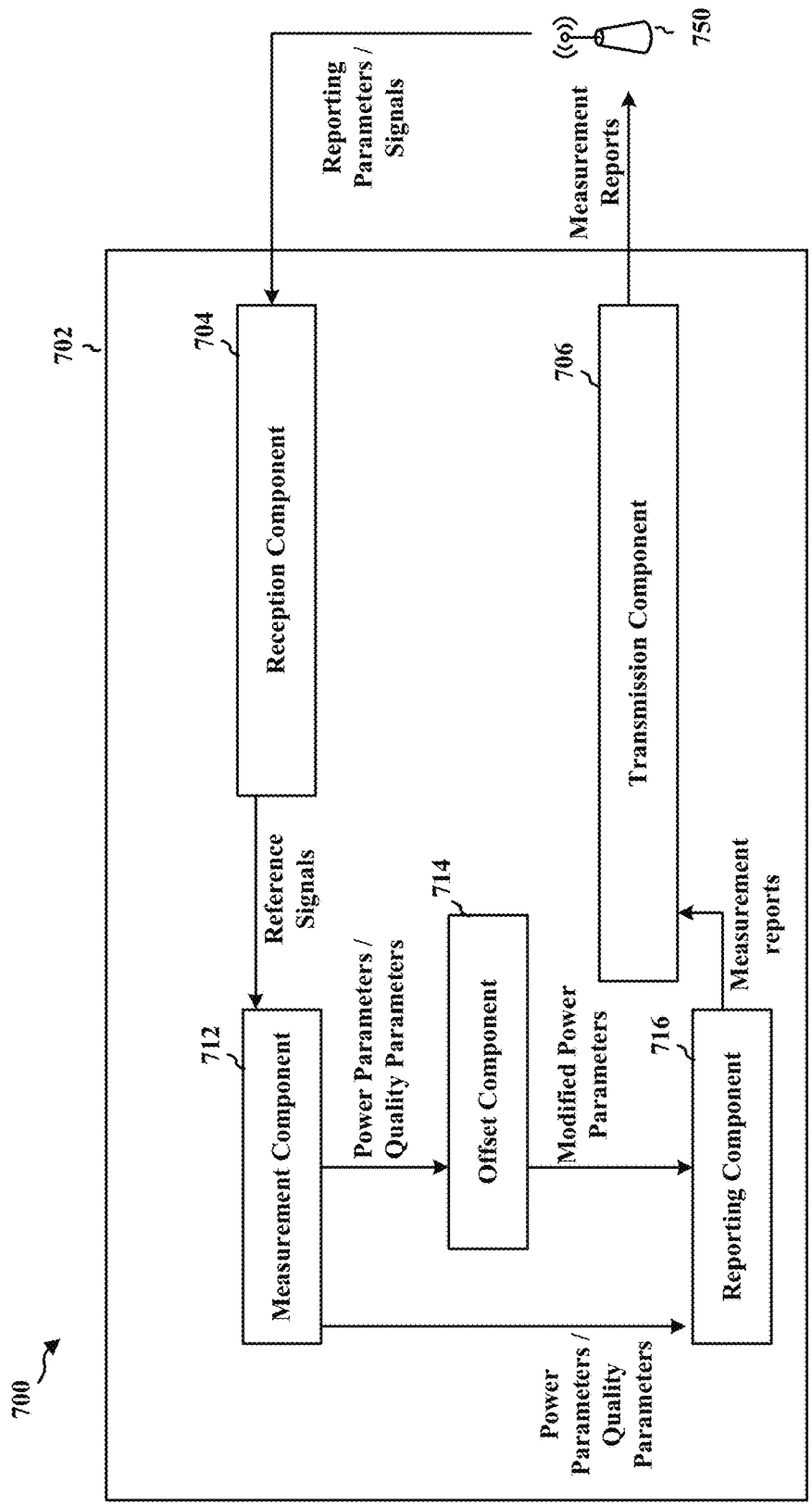
FIG. 7 is a conceptual data flow diagram illustrating the data flow between different means/components in an exemplary apparatus, in accordance with various aspects of the disclosure.

FIG. 7 is a conceptual data flow diagram 700 illustrating the data flow between different means/components in an exemplary apparatus 702. The apparatus may be a UE, and more specifically a high gain UE (e.g., the high gain UE 306 of FIG. 3B). The apparatus 702 depicts exemplary connections and/or data between different modules/means/components. It is to be understood that such connections and/or data flow are to be regarded in as illustrative and, therefore, different and/or additional connections and/or data flow may be present in different aspects.

The apparatus 702 may include a reception component 704. The reception component 704 may receive signals from a base station and/or a wireless device (e.g., the base station 750). In an aspect, the reception component 704 may receive information associated with measurement reporting, such as one or more parameters for reporting, for example, from a base station 650. In an aspect, the parameters for reporting may include one or more thresholds indicating information (e.g., a dB value) for one or more of power parameters and/or quality parameters at which the apparatus 702 is to transmit a measurement report.

According to an aspect, the reporting parameters may be associated with a first event (e.g., Event A2) that may be triggered when the apparatus 702 measures a power parameter based on signals received from the base station 750 (e.g., a serving base station) or another base station (e.g., a neighbor base station). In another aspect, the reporting parameters may be associated with a second event (e.g., Event B2) that may be triggered when the apparatus 702 measures a power parameter based on signals received from the base station 750 (e.g., a serving base station) and another base station (e.g., a neighbor base station). The reporting parameters may further include an offset associated with a base station (e.g., a neighbor base station for Event B2), one or more hysteresis value(s), and the like.

In aspects, the reception component 704 may further receive signals from which the apparatus 702 may measure parameters associated with signal power and/or quality. For example, the reception component 704 may receive reference signals from the base station 750 (e.g., a serving base station) and/or another base station (e.g., a neighbor base station).

The apparatus 702 may include a measurement component 712. In aspects, the measurement component may be configured to receive signals from the reception component 704, such as reference signals from the base station 750 (e.g., a serving base station) and/or another base station (e.g., a neighbor base station).

According to aspects, the measurement component 712 may be configured to measure one or more power parameter(s) based on signals received from reception component 704. For example, the measurement component 712 may measure a RSRP value, a RSCP value, a RSSI, or another value indicative of a power level associated with signals received from the base station 750 (e.g., a serving base station). In some aspects, the measurement component 712 may measure a RSRP value, a RSCP value, a RSSI, or another value indicative of a power level associated with signals received from another base station (e.g., a neighbor base station). The power parameter(s) may be a dB value.

In aspects, the measurement component 712 may additionally measure one or more quality parameter(s). For example, the measurement component 712 may measure a RSRQ value, a BLER value, a s SINR value, a Ec/Io value, or another value that is indicative of a quality of signals received from the base station 750 (e.g., a serving base station). In some aspects, the measurement component 712 may measure a RSRQ value, a BLER value, a s SINR value, a Ec/Io value, or another value that is indicative of a quality of signals received from another base station (e.g., a neighbor base station). The quality parameter(s) may be a dB value.

The apparatus 702 may include an offset component 714. In various aspects, the offset component 714 may be configured to receive one or more power parameter(s) and/or quality parameter(s) from the measurement component 712. According to aspects, the offset component 714 may be configured to form a modified power parameter based on application of an offset to a measured power parameter for the base station 750 (e.g., a serving base station). The offset component 714 may be configured to apply an offset to a measured power parameter based on a measured quality parameter.

In an aspect, the offset component 714 may determine whether a measured quality parameter satisfies a quality threshold. For example, the offset component 714 may determine if a measured quality parameter meets or exceeds a quality threshold. If the offset component 714 determines that the quality parameter satisfies the quality threshold, then the offset component 714 may apply an offset to a measured power parameter to form a modified power parameter.

According to one aspect, the offset may be a predetermined value, such as a value stored in a data structure that may be accessed by the offset component 714. According to another aspect, the offset component 714 may calculate an offset. For example, the offset component 714 may calculate the offset based on the quality parameter. In another aspect, the offset component 714 may switch between a first antenna (e.g., an internal antenna) and a second antenna (e.g., an external antenna) and may compute the path loss as an indication of the gain of the second antenna, which may be used as the offset. In another aspect, the offset component 714 may switch between offsets of a plurality of preconfigured offsets based on an RSSI value. In another aspect, the offset component 714 may compute the offset based on a maximum transmission power value, an uplink BLER value, or a combination of the two values.

The apparatus 702 may further include a reporting component 716. The reporting component 716 may be configured to generate one or more measurement reports. For example, the reporting component 716 may be configured to generate measurement reports associated with a serving cell (e.g., a cell provided by the base station 750), a neighbor cell (e.g., a cell provided by a neighbor base station targeted for handover), and/or a combination thereof. In aspects, the reporting component 716 may be configured to generate measurement reports in association with events for various wireless standards, such as Event A2 and Event B2 (e.g., LTE Event A2, LTE Event B2, and the like).

According to various aspects, the reporting component 716 may be configured to receive power parameters and/or quality parameters from the measurement component 712. Power parameters and quality parameters received from the measurement component 712 may be measured values (e.g., raw values, values that have not had an offset applied thereto). In one aspect, the power parameters received from the measurement component 712 may be power parameters associated with a neighbor base station, such as a neighbor base station targeted for inter-RAT handover. In one aspect, the quality parameters received from the measurement component 712 may be quality parameters for the base station 750 (e.g., a serving base station) and/or a neighbor base station (e.g., a neighbor base station targeted for inter-RAT handover).

In aspects, the reporting component 716 may be configured to receive modified power parameters from the offset component 714. The reporting component 716 may be configured to use modified power parameters where the measured power parameters would normally be used. For example, the reporting component 716 may include a modified power parameter for the base station 750 (e.g., a serving base station) in a measurement report. Further, the reporting component 716 may be configured to use a modified power parameter for the base station 750 (e.g., a serving base station) to determine when a measurement report is to be transmitted. For example, the reporting component may compare a modified power parameter for the base station 750 (e.g., a serving base station) to a threshold associated with a reporting event (e.g., Event A2 and/or Event B2, as described herein).

When the reporting component 716 determines that a measurement report is to be transmitted, the reporting component 716 may provide a measurement report to the transmission component 706. The transmission component 706 may be configured to transmit signals to a base station, such as a base station 750 (e.g., a serving base station) or a neighbor base station. For example, the transmission component 706 may be configured to transmit measurement reports that include modified power parameters (and, optionally, quality parameters and/or other measured power parameters) to the base station 750.

The apparatus may include additional components that perform each of the blocks of the algorithm in the aforementioned flowchart of FIG. 4, call flow of FIG. 5, and/or flowchart of FIG. 6. As such, each block/operation in the aforementioned call flow/flowcharts of FIGS. 4, 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
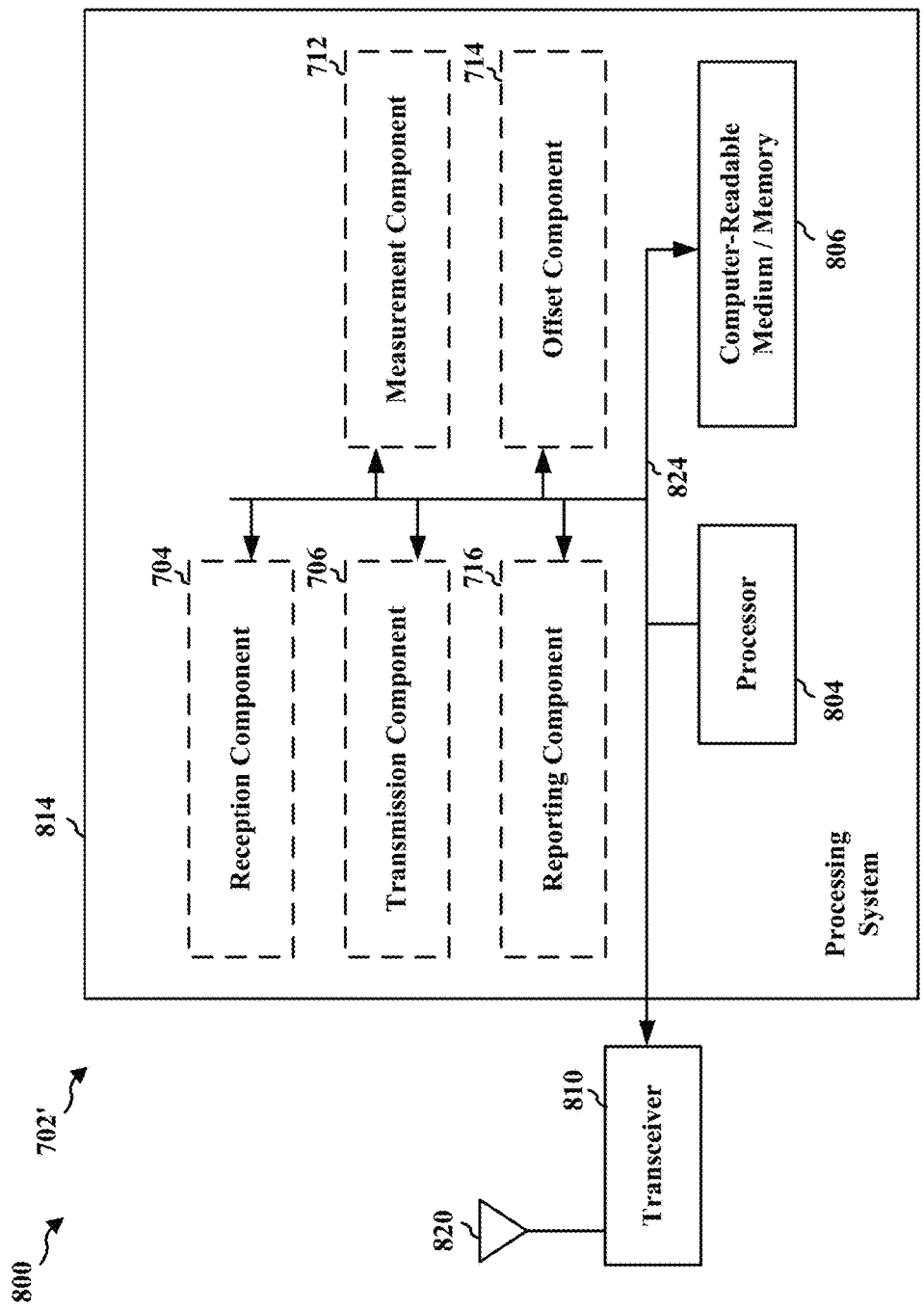
FIG. 8 is a diagram illustrating an example of a hardware implementation for an apparatus employing a processing system, in accordance with various aspects of the disclosure.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 712, 714, 716, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 712, 714, 716. The components may be software components running in the processor 804, resident/stored in the computer readable medium/memory 806, one or more hardware components coupled to the processor 804, or some combination thereof. The processing system 814 may be a component of the UE 215 and may include the memory 282 and/or at least one of the transmit processor 266, the reception processor 258, and the controller/processor 280.

In one configuration, the apparatus 800/702' for wireless communication includes means for determining, by the apparatus, a power parameter associated with communication using a first RAT. The apparatus 800/702' further includes means for determining, by the apparatus, a quality parameter associated with the communication using the first RAT. The apparatus 800/702' further includes means for applying, by the apparatus and based on the quality parameter, an offset to the power parameter to form a modified power parameter. The apparatus 800/702' further includes means for transmitting, by the apparatus, a measurement report including the modified power parameter.

In an aspect, the power parameter may include a RSRP. In an aspect, the quality parameter may include a RSRQ or a BLER. In an aspect, the apparatus 800/702' further may further include means for determining (e.g., calculating) the offset based on the quality parameter. In an aspect, the means for applying the offset is further configured to apply the offset based on determining that a power gain satisfies a power gain threshold. In an aspect, the apparatus 800/702' may further include means for determining the power gain. In an aspect, the apparatus 800/702' may further include means for determining that the power gain satisfies the power gain threshold.

In an aspect, the means for applying, based on the quality parameter, the offset to the power parameter to form a modified power parameter is configured to determine that the quality parameter satisfies a quality threshold and apply the offset to the power parameter when the quality parameter satisfies the quality threshold.

In an aspect, the means for applying the offset to the power parameter is further configured to apply the offset based on determining that a second quality parameter satisfies a second quality threshold. In an aspect, the apparatus 800/702' may further include means for determining that the second quality parameter satisfies the second quality threshold.

In an aspect, the means for transmitting the measurement report is configured to transmit the measurement report based on determining that the modified power parameter satisfies a reporting threshold. In an aspect, the apparatus 800/702' may further include means for determining that the modified power parameter satisfies the reporting threshold.

In an aspect, the measurement report is transmitted to a serving base station in association with handover to a neighbor base station. In an aspect, the apparatus 800/702' may further include means for receiving the communication from the serving base station, the serving base station associated with a first RAT and the neighbor base station associated with a second RAT. In an aspect, the first RAT is different from the second RAT.

The aforementioned means may be one or more of the aforementioned components of the apparatus 702 and/or the processing system 814 of the apparatus 702' configured to perform the functions recited by the aforementioned means. As described supra, the processing system 814 may include the transmit processor 264, the reception processor 258, and the controller/processor 280. As such, in one configuration, the aforementioned means may be the transmit processor 264, the reception processor 258, and the controller/processor 280 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication, the method comprising:
   measuring, by a user equipment (UE), a power parameter associated with received communication using a first radio access technology (RAT);
   measuring, by the UE, a quality parameter associated with the received communication using the first RAT, the quality parameter being different from the power parameter;
   applying, by the UE, an offset to the power parameter to form a modified power parameter, the offset being determined based on at least one of the quality parameter or a power gain associated with the UE;
   determining, by the UE, whether the modified power parameter satisfies a reporting threshold; and
   transmitting, by the UE and based at least in part on a determination that the modified power parameter satisfies the reporting threshold, a measurement report including the modified power parameter.

2. The method of claim 1, wherein the power parameter comprises a reference signal received power (RSRP).

3. The method of claim 1, wherein the quality parameter comprises a reference signal received quality (RSRQ) or a block error rate (BLER).

4. The method of claim 1, further comprising:
   determining the offset based on the quality parameter.

5. The method of claim 1, wherein the applying of the offset is further based on determining that the power gain satisfies a power gain threshold, and the method further comprises:
   determining, by the UE, the power gain;
   determining, by the UE, that the power gain satisfies the power gain threshold; and
   determining, based on the determining that the power gain satisfies the power gain threshold, the offset based on the power gain.

6. The method of claim 1, wherein the applying the offset to the power parameter to form a modified power parameter comprises:
   determining that the quality parameter satisfies a quality threshold; and
   applying the offset to the power parameter when the quality parameter satisfies the quality threshold.

7. The method of claim 6, wherein the applying the offset to the power parameter is further based on determining that a second quality parameter satisfies a second quality threshold, the method further comprising:
  determining that the second quality parameter satisfies the second quality threshold.

8. The method of claim 1, wherein the measurement report is transmitted to a serving base station in association with handover to a neighbor base station, the method further comprising:
  receiving the communication from the serving base station, the serving base station associated with the first RAT and the neighbor base station associated with a second RAT.

9. The method of claim 8, wherein the first RAT is different from the second RAT.

10. An apparatus for wireless communication, comprising:
  means for measuring, by the apparatus, a power parameter associated with received communication using a first radio access technology (RAT);
  means for measuring, by the apparatus, a quality parameter associated with the received communication using the first RAT, the quality parameter being different from the power parameter;
  means for applying, by the apparatus, an offset to the power parameter to form a modified power parameter, the offset being determined based on at least one of the quality parameter or a power gain associated with the UE;
  means for determining, by the apparatus, whether the modified power parameter satisfies a reporting threshold; and
  means for transmitting, by the apparatus and based at least in part on a determination that the modified power parameter satisfies the reporting threshold, a measurement report including the modified power parameter.

11. The apparatus of claim 10, wherein the power parameter comprises a reference signal received power (RSRP).

12. The apparatus of claim 10, wherein the quality parameter comprises a reference signal received quality (RSRQ) or a block error rate (BLER).

13. The apparatus of claim 10, wherein the means for applying the offset is configured to determine the offset based on the quality parameter.

14. The apparatus of claim 10, wherein the means for applying the offset is configured to:
  determine the power gain;
  determine that the power gain satisfies a power gain threshold; and
  apply the offset based on the determination that the power gain satisfies the power gain threshold.

15. The apparatus of claim 10, wherein the means for applying the offset to the power parameter to form a modified power parameter is configured to:
  determine that the quality parameter satisfies a quality threshold; and
  apply the offset to the power parameter when the quality parameter satisfies the quality threshold.

16. The apparatus of claim 15, wherein the means for applying the offset to the power parameter is further configured to:
  determine that a second quality parameter satisfies a second quality threshold; and
  apply the offset based on the determination that the second quality parameter satisfies the second quality threshold.

17. The apparatus of claim 10, wherein the measurement report is transmitted to a serving base station in association with handover to a neighbor base station, the apparatus further comprising:
  means for receiving the communication from the serving base station, the serving base station associated with the first RAT and the neighbor base station associated with a second RAT.

18. The apparatus of claim 17, wherein the first RAT is different from the second RAT.

19. An apparatus for wireless communication, comprising:
  a memory; and
  at least one processor coupled to the memory and configured to:
    measure a power parameter associated with received communication using a first radio access technology (RAT);
    measure a quality parameter associated with the received communication using the first RAT, the quality parameter being different from the power parameter;
    apply an offset to the power parameter to form a modified power parameter, the offset being determined based on at least one of the quality parameter or a power gain associated with the UE;
    determining whether the modified power parameter satisfies a reporting threshold; and
    transmit, based at least in part on a determination that the modified power parameter satisfies the reporting threshold, a measurement report including the modified power parameter.

20. The apparatus of claim 19, wherein the power parameter comprises a reference signal received power (RSRP).

21. The apparatus of claim 19, wherein the quality parameter comprises a reference signal received quality (RSRQ) or a block error rate (BLER).

22. The apparatus of claim 19, wherein the at least one processor is further configured to determine the offset based on the quality parameter.

23. The apparatus of claim 19, wherein the at least one processor is configured to apply the offset further based on determination that the power gain satisfies a power gain threshold, and the at least one processor is further configured to:
  determine the power gain;
  determine that the power gain satisfies the power gain threshold; and
  determine, based on the determination that the power gain satisfies the power gain threshold, the offset based on the power gain.

24. The apparatus of claim 19, wherein the at least one processor is configured to apply the offset to the power parameter to form a modified power parameter by:
  determining that the quality parameter satisfies a quality threshold; and
  applying the offset to the power parameter when the quality parameter satisfies the quality threshold.

25. The apparatus of claim 24, wherein the at least one processor is configured to apply the offset to the power parameter further based on determination that a second quality parameter satisfies a second quality threshold, the at least one processor further configured to determine that the second quality parameter satisfies the second quality threshold.

26. The apparatus of claim 19, wherein the measurement report is transmitted to a serving base station in association with handover to a neighbor base station, the at least one processor further configured to receive the communication from the serving base station, wherein the serving base station associated with the first RAT and the neighbor base station associated with a second RAT.

27. A non-transitory computer-readable medium storing computer executable code for wireless communication, comprising code to:
- measure, by a user equipment (UE), a power parameter associated with received communication using a first radio access technology (RAT);
- measure, by the UE, a quality parameter associated with the received communication using the first RAT, the quality parameter being different from the power parameter;
- apply, by the UE, an offset to the power parameter to form a modified power parameter, the offset being determined based on at least one of the quality parameter or a power gain associated with the UE;
- determine, by the UE, whether the modified power parameter satisfies a reporting threshold; and
- transmit, by the UE and based at least in part on a determination that the modified power parameter satisfies the reporting threshold, a measurement report including the modified power parameter.

* * * * *